(12) United States Patent
Huesken et al.

(10) Patent No.: US 7,814,426 B2
(45) Date of Patent: Oct. 12, 2010

(54) REUSABLE COMPONENT IN A COLLABORATION WORKSPACE

(75) Inventors: Jens Huesken, Elztal-Auerbach (DE);
Erwin Margewitsch, Eppelheim (DE);
Marcus R. Schwarz, Lampertheim
(DE); Johannes Unnewehr, Heidelberg
(DE); Stefan Mueller, Sinsheim (DE)

(73) Assignee: SAP Aktiengesellschaft (DE)

( * ) Notice: Subject to any disclaimer, the term of this patent is extended or adjusted under 35 U.S.C. 154(b) by 764 days.

(21) Appl. No.: 10/882,496

(22) Filed: Jun. 30, 2004

(65) Prior Publication Data

US 2006/0005163 A1   Jan. 5, 2006

(51) Int. Cl.
G06F 3/00 (2006.01)

(52) U.S. Cl. .................. 715/762; 715/741; 715/744; 715/751

(58) Field of Classification Search ......... 715/751–759, 715/762–763, 741–747, 760, 765, 826; 717/100–103; 709/204–205
See application file for complete search history.

(56) References Cited

U.S. PATENT DOCUMENTS

| | | | | |
|---|---|---|---|---|
| 5,392,390 A * | 2/1995 | Crozier | ...... | 715/751 |
| 5,659,735 A * | 8/1997 | Parrish et al. | ...... | 707/10 |
| 5,671,415 A * | 9/1997 | Hossain | ...... | 717/101 |
| 5,793,365 A * | 8/1998 | Tang et al. | ...... | 715/758 |
| 6,016,146 A * | 1/2000 | Beer et al. | ...... | 715/825 |
| 6,185,587 B1 * | 2/2001 | Bernardo et al. | ...... | 715/234 |
| 6,233,600 B1 * | 5/2001 | Salas et al. | ...... | 709/201 |
| 6,253,216 B1 * | 6/2001 | Sutcliffe et al. | ...... | 715/205 |
| 6,278,449 B1 * | 8/2001 | Sugiarto et al. | ...... | 715/826 |
| 6,327,628 B1 * | 12/2001 | Anuff et al. | ...... | 719/311 |
| 6,429,880 B2 * | 8/2002 | Marcos et al. | ...... | 715/744 |
| 6,513,152 B1 * | 1/2003 | Branson et al. | ...... | 717/100 |
| 6,594,664 B1 * | 7/2003 | Estrada et al. | ...... | 707/10 |
| 6,601,057 B1 * | 7/2003 | Underwood et al. | ...... | 707/1 |
| 6,636,889 B1 * | 10/2003 | Estrada et al. | ...... | 709/203 |
| 6,684,212 B1 * | 1/2004 | Day et al. | ...... | 707/10 |
| 6,684,369 B1 * | 1/2004 | Bernardo et al. | ...... | 715/205 |
| 6,684,370 B1 * | 1/2004 | Sikorsky et al. | ...... | 715/205 |

(Continued)

OTHER PUBLICATIONS

Wikipedia, "Web portal", http://en.wikipedia.org/wiki/Web_portal, printed Nov. 3, 2009, pp. 1-4.*

*Primary Examiner*—Weilun Lo
*Assistant Examiner*—William Wong
(74) *Attorney, Agent, or Firm*—Mintz Levin Cohn Ferris Glovsky and Popeo, P.C.

(57) ABSTRACT

Described herein are methods and apparatus, including computer program products, that implement a collaboration workspace for reusable components. One method includes receiving a specification of a workspace component, where the workspace component is capable of being used with different collaboration workspaces; providing the specification of the workspace component to a collaboration workspace with a set of parameters related to the workspace component; and presenting the workspace component as part of the collaboration workspace. The workspace component may be added to a collaboration workspace that has been formed. The set of parameters may include a first set of access restrictions associated with the collaboration workspace, a second set of access restrictions associated with the workspace component, and access restriction mappings. In that case, the method includes associating the first set with the second set of access restrictions based on the access restriction mappings.

9 Claims, 14 Drawing Sheets

U.S. PATENT DOCUMENTS

| | | | |
|---|---|---|---|
| 6,744,447 B2* | 6/2004 | Estrada et al. | 715/751 |
| 6,750,881 B1* | 6/2004 | Appelman | 715/733 |
| 6,795,830 B1* | 9/2004 | Banerjee et al. | 707/200 |
| 6,826,727 B1* | 11/2004 | Mohr et al. | 715/235 |
| 6,850,808 B2* | 2/2005 | Yuen et al. | 700/86 |
| 6,859,212 B2* | 2/2005 | Kumar et al. | 715/744 |
| 6,996,780 B2* | 2/2006 | Estrada | 715/751 |
| 7,028,262 B2* | 4/2006 | Estrada et al. | 715/751 |
| 7,032,179 B2* | 4/2006 | Mack et al. | 715/762 |
| 7,111,243 B1* | 9/2006 | Ballard et al. | 715/744 |
| 7,117,448 B2* | 10/2006 | Cooper et al. | 715/764 |
| 7,120,928 B2* | 10/2006 | Sheth et al. | 726/4 |
| 7,124,164 B1* | 10/2006 | Chemtob | 709/204 |
| 7,159,178 B2* | 1/2007 | Vogt et al. | 715/733 |
| 7,237,002 B1* | 6/2007 | Estrada et al. | 709/203 |
| 7,451,148 B2* | 11/2008 | Childress et al. | 1/1 |
| 7,475,354 B2* | 1/2009 | Guido et al. | 715/742 |
| 7,676,542 B2* | 3/2010 | Moser et al. | 709/204 |
| 2001/0008023 A1* | 7/2001 | Bond et al. | 717/8 |
| 2001/0048449 A1* | 12/2001 | Baker | 345/758 |
| 2001/0051907 A1* | 12/2001 | Kumar et al. | 705/36 |
| 2001/0051961 A1* | 12/2001 | Duxbury | 707/517 |
| 2002/0002586 A1* | 1/2002 | Rafal et al. | 709/205 |
| 2002/0023122 A1* | 2/2002 | Polizzi et al. | 709/202 |
| 2002/0026441 A1* | 2/2002 | Kutay et al. | 707/5 |
| 2002/0052954 A1* | 5/2002 | Polizzi et al. | 709/225 |
| 2002/0097267 A1* | 7/2002 | Dinan et al. | 345/757 |
| 2002/0119434 A1* | 8/2002 | Beams et al. | 434/322 |
| 2002/0129106 A1* | 9/2002 | Gutfreund | 709/205 |
| 2002/0138331 A1* | 9/2002 | Hosea et al. | 705/10 |
| 2002/0152245 A1* | 10/2002 | McCaskey et al. | 707/530 |
| 2002/0178290 A1* | 11/2002 | Coulthard et al. | 709/246 |
| 2003/0004993 A1* | 1/2003 | Templeton et al. | 707/513 |
| 2003/0023677 A1* | 1/2003 | Morison Zuill et al. | 709/203 |
| 2003/0050986 A1* | 3/2003 | Matthews et al. | 709/206 |
| 2003/0055878 A1* | 3/2003 | Fletcher et al. | 709/203 |
| 2003/0063124 A1* | 4/2003 | Melhem et al. | 345/777 |
| 2003/0110315 A1* | 6/2003 | Upton | 709/328 |
| 2003/0110448 A1* | 6/2003 | Haut et al. | 715/513 |
| 2003/0117437 A1* | 6/2003 | Cook et al. | 345/764 |
| 2003/0120599 A1* | 6/2003 | Agboatwalla et al. | 705/50 |
| 2003/0145305 A1* | 7/2003 | Ruggier | 717/100 |
| 2003/0156134 A1* | 8/2003 | Kim | 345/753 |
| 2003/0167315 A1* | 9/2003 | Chowdhry et al. | 709/218 |
| 2003/0229508 A1* | 12/2003 | Zweben et al. | 705/1 |
| 2004/0003371 A1* | 1/2004 | Coulthard et al. | 717/101 |
| 2004/0054675 A1* | 3/2004 | Li | 707/100 |
| 2004/0098467 A1* | 5/2004 | Dewey et al. | 709/219 |
| 2004/0104933 A1* | 6/2004 | Friedrich et al. | 345/751 |
| 2004/0107249 A1* | 6/2004 | Moser et al. | 709/204 |
| 2004/0113940 A1* | 6/2004 | Brockway et al. | 345/741 |
| 2004/0113943 A1* | 6/2004 | Cooper et al. | 345/744 |
| 2004/0183831 A1* | 9/2004 | Ritchy et al. | 345/762 |
| 2004/0187140 A1* | 9/2004 | Aigner et al. | 719/328 |
| 2004/0223009 A1* | 11/2004 | Szladovics et al. | 345/760 |
| 2005/0055634 A1* | 3/2005 | Burns et al. | 715/517 |
| 2005/0120288 A1* | 6/2005 | Boehme et al. | 715/500 |
| 2005/0138118 A1* | 6/2005 | Banatwala et al. | 709/204 |
| 2005/0246627 A1* | 11/2005 | Sayed | 715/513 |
| 2005/0268227 A1* | 12/2005 | Carlson et al. | 715/517 |
| 2006/0031849 A1* | 2/2006 | Barta et al. | 719/320 |
| 2006/0053376 A1* | 3/2006 | Ng et al. | 715/742 |
| 2006/0206804 A1* | 9/2006 | Barnett | 715/513 |

* cited by examiner

REUSABLE COMPONENT IN A COLLABORATION WORKSPACE

BACKGROUND

The following description relates to collaboration workspaces, and more particularly to reusable components in a collaboration workspace.

Many collaboration tools exist today to help computer users communicate with other users in different locations in an efficient manner. For example, network-meeting applications provide a virtual space in which to hold real-time, synchronous meetings. Such applications can offer live presentations or other objects for meeting participants to review and edit. The applications can also offer instant messaging (IM), chat services for communications among participants, and whiteboards on which participants can provide input. Other collaboration tools may provide asynchronous interaction. For example, group members may interact using e-mail or other messaging options, and a collaboration area may be provided where members can review, annotate, comment on, and edit documents.

In general, different collaboration tools can provide users with different benefits. In some situations, one tool is appropriate, while in others, a different tool may be. It is unlikely, however, that any single company will provide the best-of-breed application in all of the areas that will interest a typical user. As a result, users may be required to establish a number of accounts, learn a number of interfaces for establishing collaboration sessions, and separately schedule and track various sessions.

To provide a variety of collaboration tools, a collaboration workspace may be provided that integrates the variety of collaboration tools. In addition to collaboration tools, a collaboration workspace may include resources, such as documents, drawings, and the like which may be accessed by multiple users of a collaboration workspace. The collaboration tools and/or resources may be included in the workspace, or the workspace may provide access through interface components. For example, a workspace may include various portal views, each of which presents an underlying tool to a user and provides access to the tool. Different combinations of collaboration tools and/or resources may be provided as various types of workspaces. To provide different combinations, templates may be provided, each of which may be used for a particular purpose.

SUMMARY

Described herein are methods and apparatus, including computer program products, that implement a collaboration workspace for reusable components.

In one general aspect, the techniques feature a method of integrating a workspace component into a collaboration workspace. In that aspect, the method includes receiving a specification of a workspace component, where the workspace component is capable of being used with different collaboration workspaces; providing the specification of the workspace component to a collaboration workspace with a set of parameters related to the workspace component; and presenting the workspace component as part of the collaboration workspace.

Implementations may include one or more of the following features. The workspace component may be provided in response to a request relating to a collaboration workspace template during generation of a collaboration workspace. The workspace component may be added to a collaboration workspace that has been formed. The workspace component may disable workspace content in the collaboration workspace. The method may further include receiving a specification of an Nth workspace component for the collaboration workspace and providing the specification of the Nth workspace component to the collaboration workspace with an Nth set of parameters related to the Nth workspace component. Presenting the workspace component may include displaying the workspace component as a defined part of a portal display. The set of parameters may include a first set of access restrictions associated with the collaboration workspace, a second set of access restrictions associated with the workspace component, and access restriction mappings. In that case, the method further includes associating the first set of access restrictions with the second set of access restrictions based on the access restriction mappings. The access restrictions may include a definition of one or more roles. The method may further include removing the workspace component from the collaboration workspace. The method may further include providing the workspace component to an Nth collaboration workspace with an Nth set of or more parameters related to the workspace component, and presenting the workspace component as part of the Nth collaboration workspace. The workspace component may be stored in a directory of content for the collaboration workspace.

In another aspect, a collaboration workspace system includes a server and one or more clients. The server includes a workspace content directory to store one or more specifications of workspace components that are capable of being used with different collaboration workspaces, and a collaboration engine. The collaboration can perform operations including, including a workspace component in a collaboration workspace based on a set of parameters. The clients include a workspace presenter to present a collaboration workspace generated by the collaboration engine to an interface.

Implementations may include one or more of the following features. The collaboration engine may include the workspace component in a collaboration workspace in response to a request relating to a collaboration workspace template during generation of the collaboration workspace. The collaboration engine may add the workspace component to a collaboration workspace that has been formed. The workspace component may disable workspace content in the collaboration workspace. The collaboration engine may perform operations further including, including an Nth workspace component in the collaboration workspace based on an Nth set of parameters. Presenting a collaboration workspace to an interface may include displaying a workspace component as a defined part of a portal display. The set of parameters may include a first set of access restrictions associated with the collaboration workspace, a second set of access restrictions associated with the workspace component to be included in the collaboration workspace, and access restriction mappings. In that case, the collaboration engine can perform operations further including associating the first set of access restrictions with the second set of access restrictions based on the access restriction mappings. The access restrictions may include a definition of one or more roles. The collaboration engine may be able to perform operations further including, including the workspace component in an Nth collaboration workspace based on an Nth set of parameters.

In another aspect, a computer program product, tangibly embodied in an information carrier, includes instructions operable to cause a data processing apparatus to perform operations including, receiving a specification of a workspace component, where the workspace component is capable of being used with different collaboration workspaces; providing the specification of the workspace component to the collaboration workspace with a set of parameters related to the workspace component; and presenting the workspace component as part of the collaboration workspace.

Implementations may include one or more of the following features. The workspace component may be provided in response to a request relating to a collaboration workspace template during creation of a collaboration workspace. The workspace component may be added to a collaboration workspace that has been formed. The workspace component may disable workspace content in the collaboration workspace. The computer program product may include instructions to perform operations including, receiving a specification of an Nth workspace component for the collaboration workspace, and providing the specification of the Nth workspace component to the collaboration workspace with an Nth set of parameters related to the Nth workspace component. Presenting the workspace component may include displaying the workspace component as a defined part of a portal display. The set of parameters may include a first set of access restrictions associated with the collaboration workspace, a second set of access restrictions associated with the workspace component, and access restriction mappings. In that case, the computer program product further includes instructions to perform operations including, associating the first set of access restrictions with the second set of access restrictions based on the access restriction mappings. The access restrictions may include a definition of one or more roles. The computer program may include instructions to perform operations including, removing the workspace component from the collaboration workspace. The computer program may include instructions to perform operations including, providing the workspace component to an Nth collaboration workspace with an Nth set of or more parameters related to the workspace component, and presenting the workspace component as part of the Nth collaboration workspace.

The collaboration workspace for reusable components described here may provide one or more of the following advantages. A collaboration workspace may be modified such that a workspace component can be added and/or removed. Each workspace component may define a collaboration tool, an interface to a collaboration tool, a resource, or a modification to one or more collaboration tools, interfaces, and/or resources. Workspace components may be added and/or removed from a collaboration workspace before, during, and/or after a collaboration workspace is formed such that a collaboration workspace may be customized regardless of whether the collaboration workspace has been formed. The workspace components may be reusable such that the same workspace component may be used in multiple collaboration workspaces without modifying the workspace component. The workspace components may be separately deliverable units from a collaboration workspace such that, for example, third-party software vendors may create workspace components or sets of workspace components. The reusable components may advantageously encapsulate many technical details such that workspace components may become part of a workspace without requiring intimate knowledge of a workspace component or a workspace.

To integrate a workspace component with a collaboration workspace, parameters may be defined for the workspace component. A workspace component may be able to interface with tools that are not part of a workspace component, such that, for example, data and/or systems separate from the collaboration workspace may be synchronized. For example, a workspace component may define that, on certain changes of a state of a collaboration workspace (e.g., generation, modification, deletion, and the like of a collaboration workspace), a database may be notified of the new state of the collaboration workspace and perform appropriate tasks.

Access to components may depend on properties of a user of a collaboration workspace. For example, in a role-based implementation, a collaboration workspace may restrict access to workspace components based on a role of a user. In that example, roles may be defined to include manager and general employee and a certain workspace component may be accessible by users associated with the general employee role but not by users associated with the manager role.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

Like reference numbers and designations in the various drawings indicate like elements.

DETAILED DESCRIPTION

The systems and techniques described here relate to reusable components in a collaboration workspace.

Figure 1A:
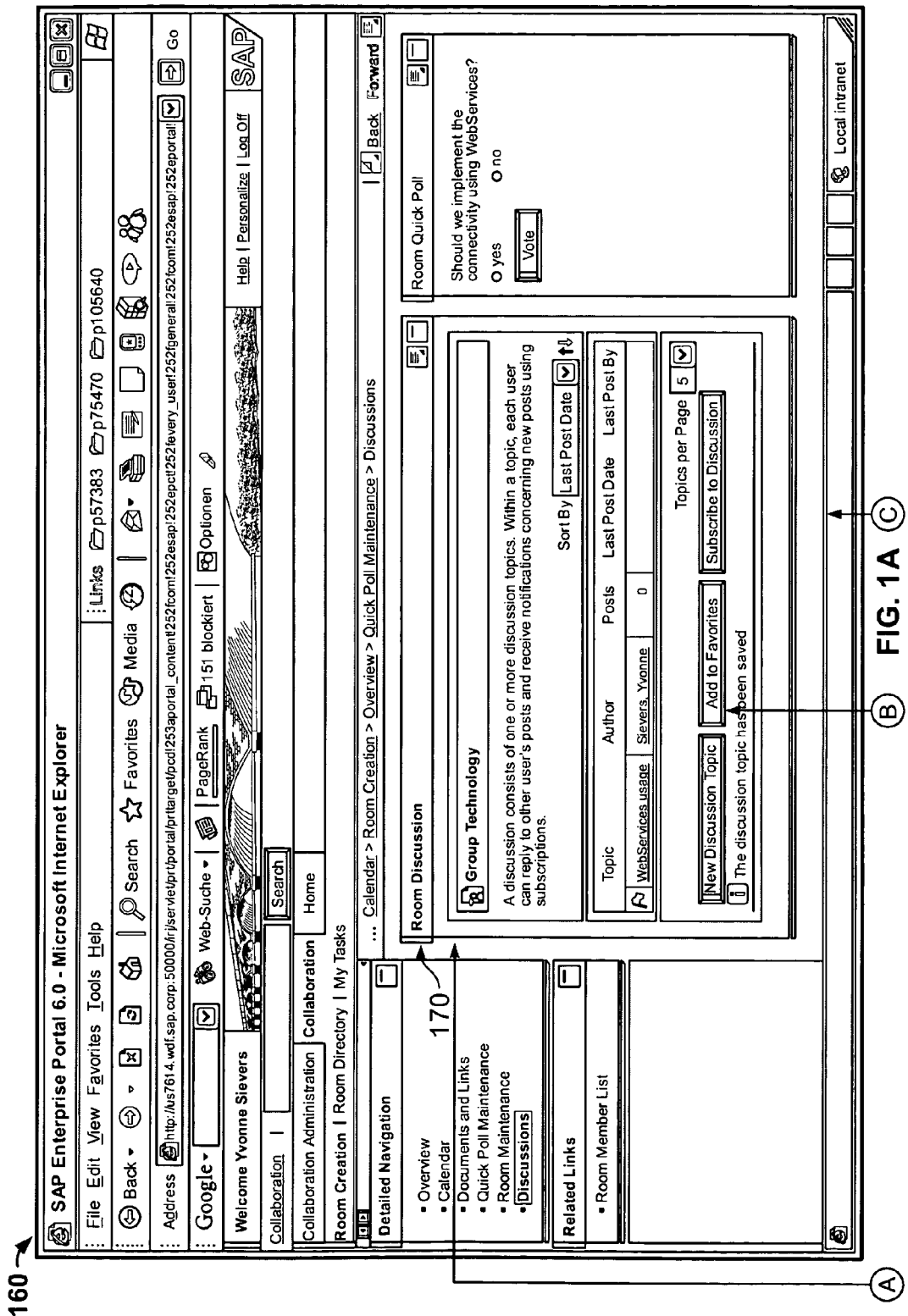
FIG. 1 is a diagram of components used with a collaboration workspace.
Figure 1B:
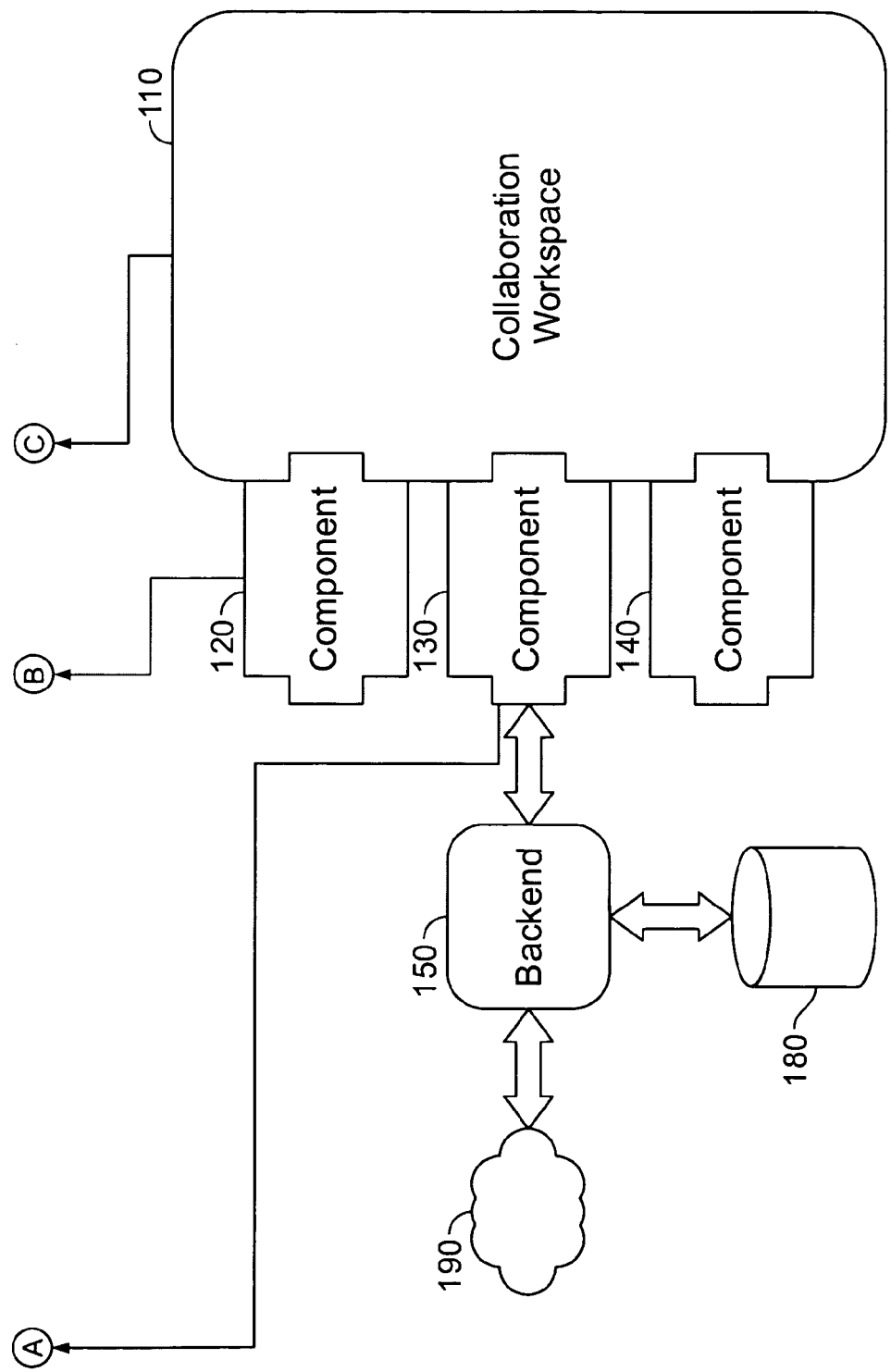

FIG. 1 is a diagram of components used with a collaboration workspace 110. Collaboration workspace 110 is integrated with workspace components 120, 130, and 140, of which workspace component 130 can access backend 150. The collaboration workspace 110 may include any combination of tools, resources and/or access to tools and/or resources. For example, the collaboration workspace 110 may be presented in a graphical user interface and the workspace may include a calendar tool and a portal view for accessing a network-meeting tool. Access to tools and/or resources may be in the form of portal views (i.e., portlets or iViews), which may present information in any combination of formats, such as text, figures, graphs, reports, tables, or charts. The portal views may be interactive, such that a user can interact with a tool and/or resource. For example, if a portal view provides access to a network-meeting tool, the portal view may allow a user to interact with the network-meeting tool during a network meeting session. In alternative implementations the collaboration tools, resources, and/or portal views might be located in workspace components rather than dispersed among the collaboration workspace 110 and the workspace components.

User interface 160 illustrates how the collaboration workspace 110, including the workspace components 120, 130, and 140, might appear to a user. The collaboration workspace 110 includes a discussion area that includes a discussion tool 170 for collaborative discussion. The discussion tool 170 is defined by the workspace component 130, which has access to a persistence area 180 and a network 190 through the backend 150. The discussion tool 170 can use the persistence area 180 to store discussion threads. The component 120 defines an "Add to favorites" feature that is added to the discussion tool 170 by virtue of the component 120. Thus, for example, if the component 120 were removed from the collaboration workspace 110, the "Add to favorites" feature would cease to be part of the discussion tool 170. The component 140 defines access privileges to the discussion tool 170. The component 140 defines that users associated with an administrator role can edit and modify messages posted in the discussion tool 170. For example, to ensure that obscene content is not posted on the discussion application, users associated with a visitor role can only add or read messages posted in the discussion application 170, and users associated with a blocked user role are excluded from reading or posting messages.

Each of the workspace components that are integrated with the collaboration workspace 110 includes a specification that defines a modification to the collaboration workspace 110. Modifications may include an additional collaboration tool, an additional resource, an additional portal view, or a modification to one or more collaboration tools, resources and/or portal views that are part of a collaboration workspace. As an example, the collaboration workspace 110 might be presented in a graphical user interface and the collaboration workspace 110 might include a portal view for a calendar tool. In that example, a workspace component might be a modification of the calendar tool that changes the title bar of the portal view to include a name of the collaboration workspace (e.g., "Aerospace Engineering Development Squad"). In another example, a workspace component may be an additional tool, such as a task progress tool that displays a list of all tasks and their respective progress. In addition to modifying a collaboration workspace such that new content is introduced, a workspace component may modify a collaboration workspace by effectively removing content from the collaboration workspace. For example, one modification may disable a collaboration tool from being presented in a collaboration workspace.

Each workspace component includes parameters. Parameters describe aspects of a workspace component and define how a workspace component is used or presented in a collaboration workspace. In other words, parameters describe a workspace component and how a workspace component is handled in conjunction with a collaboration workspace. Parameters might include, as examples, the name of a workspace component, a description of the workspace component, or an identifier of the collaboration workspace with which the workspace component is associated. For example, a workspace component may be a calendar tool, and parameters might include a name "collaboration calendar" and a description "A team workspace collaboration calendar."

Because parameters define how a workspace component is used or presented in a collaboration workspace, parameters may assist in integrating the workspace component with a collaboration workspace. Parameters may define information that can be used to remove affinity between the content of workspace component and a collaboration workspace. By removing this affinity, workspace components can be automatically added to a collaboration workspace, moved between collaboration workspaces, removed from a collaboration workspace, shared across different collaboration workspaces, copied, deleted, and the like. Parameters may include backend system event handlers, mappings of properties of a collaboration workspace with properties of a workspace component, and access control limitations.

Backend system event handlers define behaviors that should be performed in conjunction with a backend system upon the occurrence of an event related to a collaboration workspace. To perform defined behaviors, backend system event handlers are connected with a backend system. Backend system event handlers may be tied to lifecycle events, such as creation, modification, and deletion of a workspace component and/or collaboration workspace, or other events related to a workspace component and/or collaboration workspace, such as the adding of new members to the collaboration workspace, access rights changes for members, and the like. For example, one backend system event handler may be tied to an event where the workspace component 120 is added to the collaboration workspace 110. The backend system event handler may be defined to create a persistence area for the workspace component 120 (i.e., an area to for saving data related to the workspace component) and to pass the necessary context information to the collaboration workspace 110 such that the collaboration workspace can use the persistence area to persist and retrieve information.

Thus, backend system event handlers may play a critical role in integrating the collaboration workspace 110 with the workspace component 120 by providing access to backend systems. In addition to creating a persistence area, backend system event handlers may, for example, delete a persistence area upon the removal of the workspace component 120 from the collaboration workspace 110.

By performing behaviors in conjunction with a backend system upon certain events, backend system event handlers may play a critical role in making the workspace component 120 attachable and detachable from the collaboration workspace 110. In other words, backend system event handlers can remove an affinity to a collaboration workspace that content of a workspace component may have. In the context of the previous examples, because a backend system event handler ensures that a persistence area is created for the collaboration workspace 110, and provides the necessary information for the persistence area to be used by the collaboration workspace 110, that backend system event handler helps attach the workspace component 120 to the collaboration workspace 110. Also, because a backend system event handler may delete the created persistence area, the workspace component 120 can be properly detached from the collaboration workspace 110.

Mappings associate properties of a workspace component with other properties and/or values. Many types of mappings may exist. One type of mapping may associate properties of a workspace component with properties of a collaboration workspace. By providing this association, a workspace component can understand the context of a collaboration workspace. Thus, a workspace component can be defined regardless of a type of collaboration workspace to which the component will be added and the component can interface with a collaboration workspace by reference to the mappings, or vice versa. For example, a collaboration workspace may include a property named "time last modified", a workspace component may include a property named "time last changed", a mapping may be defined as an association between "time last modified" and "time last changed", and the workspace component may be defined to synchronize the "time last changed" property with all properties to which the property is mapped. In accordance with that example, the workspace component can use the mapping to modify the "time last modified" property of the collaboration workspace when the "time last changed" property of the workspace component is modified. As another example, access control limitations of a workspace component may be mapped to access control limitations of a collaboration workspace (as will be discussed later).

Another type of mapping may associate a property of a workspace component with a value. To provide this association, a mapping may include information such as a path, a property, and a value. If a mapping includes that information, a path may represent a tool, resource, or portal view of a workspace component to which the mapping applies. A property may represent a property of the object identified by that path. Also, a value may represent the value that should be defined for a corresponding property. For example, if a workspace component includes a calendar tool and that tool includes a property for the title of the calendar tool, a mapping may have a path that identifies the calendar tool (e.g., an identifier of the calendar tool such as "CalendarTool"), a property that identifies the title of the tool (e.g., "Title"), and a value for the title (e.g., "SoftwareWorks Team").

Mappings may be provided by any technique. As examples, the mappings may be predefined or user-defined by input received during the integration of a workspace component into a collaboration workspace. Because mappings may provide an interface between a workspace component and a collaboration workspace, mappings may assist the integration of the workspace component with the collaboration workspace, and the detachability of a workspace component from the collaboration workspace. For example, a workspace component may use different names to identify tools that are expected to be in the collaboration workspace 110 than those names used by the collaboration workspace 110. Because mappings can provide an association between the names expected to be used and the names used to identify tools in the collaboration workspace 110, the workspace component may automatically be able to interface with the collaboration workspace 110 by referencing mappings.

Access control limitations restrict the ability of a user to access tools and/or resources. Any combination of techniques and/or mechanisms may be used to restrict access. As an example of one technique, access may be limited based on the identity of a user. In accordance with that technique, in one example implementation, collaboration workspace 110 may be part of a role-based collaboration system and user access to a collaboration tool may depend on the role or roles associated with a user. As another example, access control may be defined in relation to each workspace component or parts of a component. In accordance with that example, in a role-based system, one or more roles may be associated with a workspace component or parts of a workspace component, such as a portal view. As another example of a technique, a role-based system may be combined with access permissions (i.e., permissions that define the types of interactions a role can have with a tool or resource). As an example implementation, different levels of permissions, such as owner, write, and read, may define access permissions of a role. Owner may allow a role to create, edit, and view collaboration workspace content; write may allow a role to edit and view collaboration workspace content; and, read may allow a role to view collaboration workspace content. Thus, if a manager role had owner access permissions, an employee role had write access permissions, and the workspace component 120 were associated with the role manager and the role employee; both the manager and employee role can view and edit workspace content; however, only the manager can create workspace content.

In addition to defining the access related to a tool or resource, the access control limitations may define the access of content related to a tool or resource. For example, a document handling tool, such as a word processor, may have certain access control limitations associated with the tool. Thus, in a role-based system, only certain roles may access the tool. In addition, the documents that are handled by the tool may have associated access control limitations. Thus, even if a set of roles can access the tool, only certain roles from that set of roles may be able to access documents that are handled by that tool.

A workspace component may assume the same access control restrictions as imposed on workspace content of a collaboration workspace that the component modifies. Thus, the workspace component may assume access restrictions of the tool or resource that may be modified by component. Having a workspace component assume the access control restrictions of the workspace content of a collaboration workspace may facilitate defining the access control restrictions of a workspace component. Access control restrictions of a workspace component may be used by backend systems, such as the backend 150, to help determine whether a user can access the backend. Because access control restrictions defined by workspace components may vary from the access control restrictions defined in a collaboration workspace, mappings may exist between the two sets of access control restrictions. For example, if the collaboration workspace 110 were part of a role-based system with roles defined as manager and employee, and the workspace component 140 had roles defined as leader and associate, the workspace component 140 may have a mapping of the leader role to the manager role and a mapping (i.e., a role mapping) of the associate role to the employee role. Thus, roles may be automatically mapped from a collaboration workspace to a workspace component and/or vice versa. Also, because roles may be defined for workspace content, automatic role mapping may also apply to workspace content. For example, if a tool is assigned a certain role, the objects related to the tool may be assigned the same role and users associated with the role can access both the tool and the objects related to the tool.

A backend includes a system that can be accessed by a workspace component and is not part of a collaboration workspace. For example, a backend may be a software application, such as a database application, that a workspace component accesses, for example, to store and retrieve data. Thus, by accessing a backend system, a workspace component and/or a collaboration workspace can access information provided from outside of the collaboration workspace, and may present that information in a uniform user interface (i.e., a user interface including the collaboration workspace). As an example, a workspace component may access a weather reporting service of a weather monitoring system. Information provided by the weather reporting service, such as the current temperature in London, England, may be provided via the service to the workspace component. The workspace component may present that information as part of a graphical user interface provided by a collaboration workspace that includes a certain color scheme, font formatting, and layout.

In FIG. 1, backend 150 is accessible through the workspace component 130. To provide information flow between the backend 150 and the workspace component 130, the workspace component 130 defines the interaction of the backend system with the workspace component 130 (i.e., how the workspace component accesses the backend 150). For example, if the workspace component 130 defines an interactive portal view of a tool provided by the backend 150, all accesses of the tool and responses to those accesses would flow to the backend 150.

Figure 2:
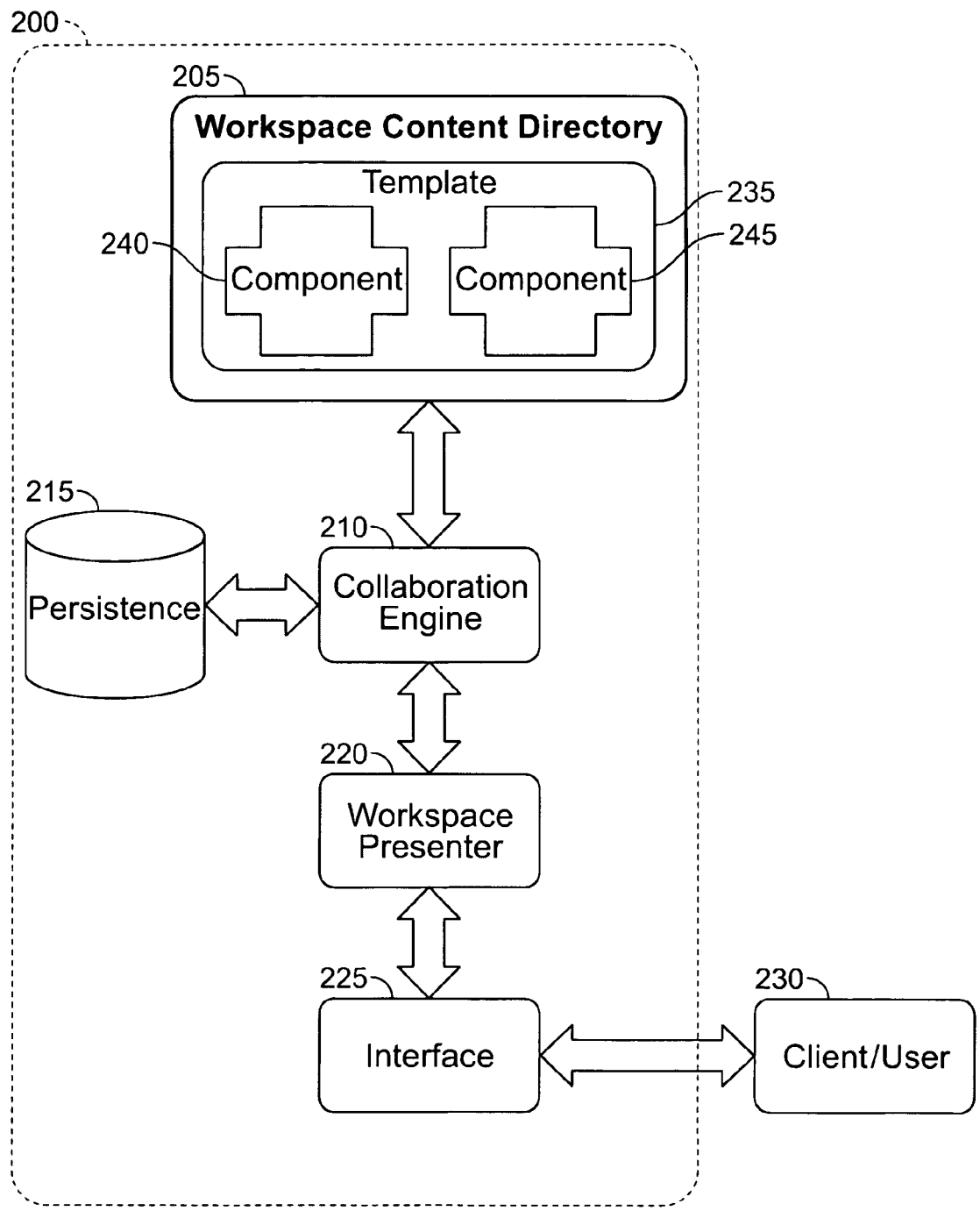
FIG. 2 is a schematic diagram of a collaboration workspace system.

FIG. 2 is a schematic diagram of a collaboration workspace system 200. The system 200 forms a collaboration workspace from a template and any number of workspace components that are stored in a workspace content directory 205. Once the collaboration workspace is formed, the workspace is presented to a user 230 via interface 225.

The workspace content directory 205 stores content, such as a workspace template 235 and workspace components 240 and 245, that can be used to generate collaboration workspaces, such as the collaboration workspace 110 of FIG. 1. The template 235 provides a default combination of collaboration workspace content, such as tools, documents, and/or portal views, from which a collaboration workspace can be formed. The workspace content directory 205 may store a number of templates from which the user 230 may choose a template that defines a desired combination of content. For example, one template may include content that is generally desired for accountants, such as a calculator, a financial news bulletin board, a spreadsheet tool, and a document including accounting standards; whereas, another template may include content that is generally desired for civil engineers, such as a computer aided design tool, a scientific calculator, and a document including regulations that apply to construction.

Workspace components define modifications to a collaboration workspace. The types of modifications may include adding, removing, or changing workspace content. Depending on the workspace component, a workspace component may be used for any collaboration workspace or may be used for only a specific type of collaboration workspace. For example, a workspace component may define a calendar tool that can be added to any collaboration workspace. As another example, a workspace component may be a modification that adds holidays recognized in the state of California to a calendar tool; thus, requiring a calendar tool to be part of a collaboration workspace to which the component will be added.

Templates and/or workspace components may define workspace content by defining a layout of workspace content (e.g., tools or resources) and defining that workspace content. As an example of defining the layout of workspace content, a workspace component may define a calendar tool to be presented in the left side of a windowpane with a dark blue title bar with a fixed size of 160 by 120 pixels. Workspace content may be defined using any technique. One technique of defining workspace content may include defining a tool as a front-end to a backend system. An example implementation of that technique may be a workspace component that defines an interface to a calendar tool (i.e., a portlet, portal view, or iView). In that example, the workspace component may define the layout of the calendar tool such that the calendar tool is presented as part of a common schema that is defined for a collaboration workspace. To provide data and functionality to the calendar tool, the workspace component may access a backend system that stores calendar information and performs functionality associated with the calendar tool. Another technique may include defining workspace content as program data. For example, workspace content may be a document formatted in accordance with a format used by a word processing application (e.g., a Microsoft Word 2000 formatted document). As another example technique, workspace content may be code that is interpretable by a workspace presenter. In that technique, context information may be provided to a collaboration workspace by way of parameters. The context information defines how the code should function in the environment defined by a collaboration workspace. For example, HTML code that is interpretable by a collaboration workspace presenter may be provided. In another example, a Java applet may be provided and environment variables for that applet may be provided to the collaboration workspace such that the applet functions appropriately in the collaboration workspace. Because context information can be provided to a collaboration workspace, the code that is part of a workspace component's content may be easily and automatically attached and detached from a collaboration workspace.

Although the system 200 requires a template to define a default collaboration workspace, in alternative implementations of the system 200, a template need not be used to form a collaboration workspace and a collaboration workspace may be formed from workspace components. For example, a user may be able to define a collaboration workspace by selecting from a list of workspace components, and without selecting a template. Also, although FIG. 2 depicts the components 240 and 245 as part of the template 235, in alternative implementations the components need not be part of the template 235. Also, the collaboration engine 210 may generate an instance of a collaboration workspace and later integrate the components 240 and 245 into the instance of the collaboration workspace.

The collaboration engine 210 retrieves content, such as the template 235, from the workspace content directory 205 to generate an instance of a collaboration workspace (i.e., form a collaboration workspace). The collaboration engine 210 may use any of a number of techniques to generate the collaboration workspace. For example, if content for a collaboration workspace includes a template, a workspace component, and mappings between properties of the collaboration workspace defined by the template and properties of the workspace component, the collaboration engine may form a collaboration workspace by matching the properties of the workspace component with properties of the template using the mappings, thus integrating the properties.

The persistence area 215 provides a location where the collaboration engine 210 can store information related to a collaboration workspace. The persistence area may be any type of persistence area, such as a storage device. Stored (i.e., persisted) information related to a collaboration workspace may include the content that makes up a collaboration workspace, information pertaining to the state of a collaboration workspace (e.g., parameters of a collaboration workspace, such as the name), parameters for integrating a collaboration workspace with workspace components, and/or program data used by a collaboration workspace (e.g., documents created by a word processing tool used in conjunction with a collaboration workspace). For example, stored parameters related to a collaboration workspace can be used to create a collaboration workspace that includes a combination of workspace components.

The workspace presenter 220 presents generated collaboration workspaces to the user interface 225. As part of presenting a generated collaboration workspace, the workspace presenter 220 presents an initial instance of a collaboration workspace and later changes to the configuration of a collaboration workspace resulting from user interaction. To provide an updated presentation of a collaboration workspace, the workspace presenter 220 may interact with the collaboration engine 210. For example, if a user of a collaboration workspace launches an instant messaging tool (i.e., a chat room type tool), the collaboration engine 210 may handle user interaction with the instant messaging tool and continually update information that the workspace presenter 220 uses to present the collaboration workspace to the interface 225. One example of a workspace presenter may be a web browser, which may receive a collaboration workspace as HTML and other types of browser-interpretable code (e.g., JavaScript, Java, shockwave, and the like). In that example, the web browser interprets a generated collaboration workspace (i.e., the HTML and other code) that is generated by software (i.e., a collaboration engine) running on a client or server-side computer system.

The interface 225 may be any type of appropriate interface, such a graphical user interface or a command-line interface, that allows the user 230 to interface with a collaboration workspace. For example, the interface may be a portal display including portal views. In that example, if a workspace component defines a collaboration tool, the collaboration tool may be displayed as a defined part of the portal display (e.g., in a portal view).

If access to components or parts of the collaboration workspace is restricted depending on properties of the user 230, the collaboration engine 210 and/or the workspace presenter 220 may also ensure that access control limitations are observed. For example, if the collaboration system 200 is a role-based collaboration system, a collaboration workspace that has a calendar tool may have a manager and employee role defined, and the collaboration workspace may define that the manager may edit and view a calendar presented by the calendar tool, whereas the employee may only view the calendar. In that example, if the user 230 is associated with an employee role, the workspace presenter 220 may allow the user 230 to view the calendar but not allow the user 230 to edit the calendar.

Figure 3:
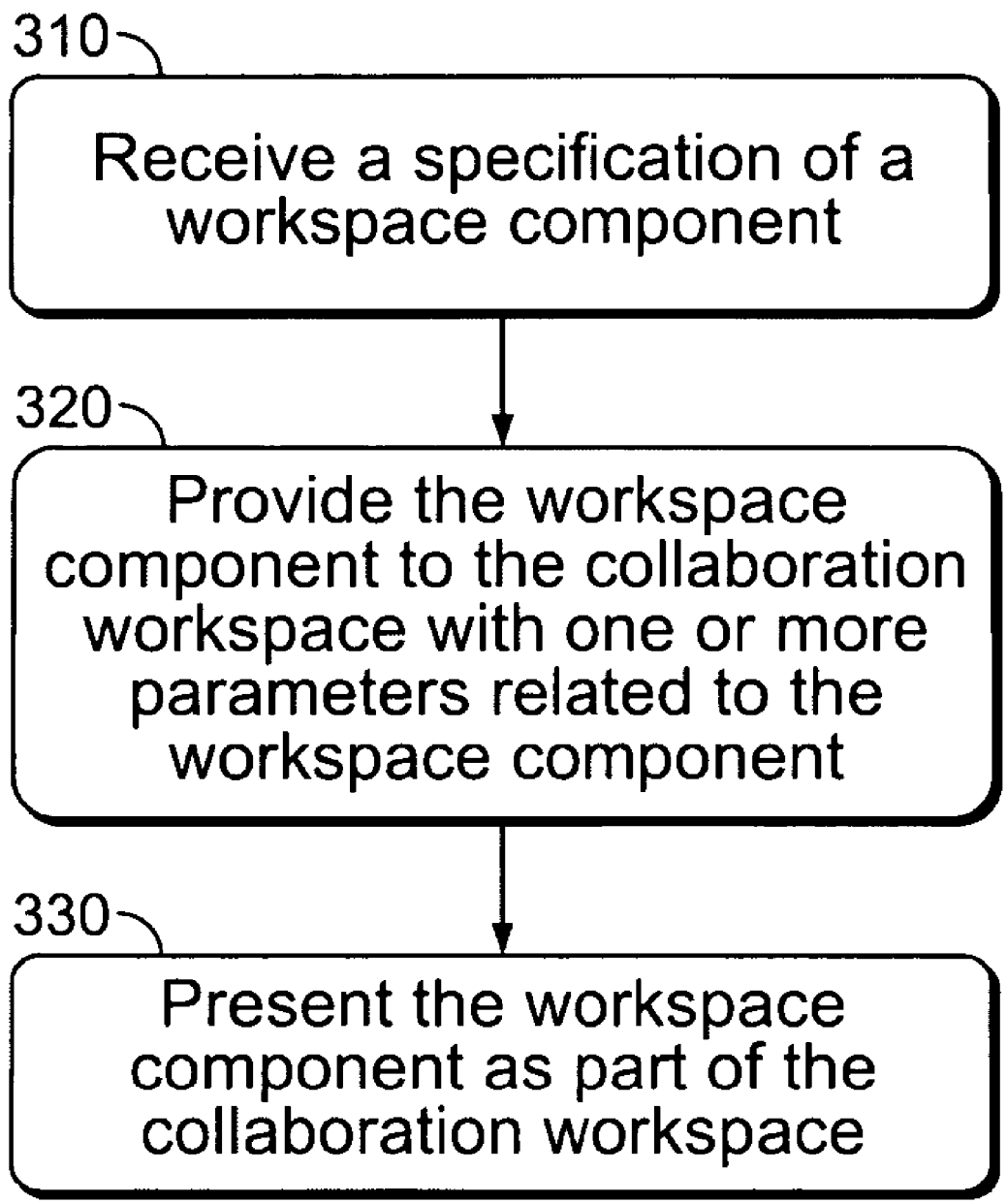
FIG. 3 is a flowchart of a process of presenting a workspace component.

FIG. 3 is a flowchart of a process of presenting a workspace component. At 310 a specification of a workspace component is received. The specification may be received in a collaboration system, such as at the workspace content directory 205 of the collaboration system depicted in FIG. 2. The specification may define any type of modification to a collaboration workspace, such as a collaboration tool, a resource, a portal view, or a modification to any of those. Further, the specification may include parameters that define properties of the workspace component, such as a name or description. For example, a workspace component may define a bulletin board tool and the specification of that workspace component may be provided to a workspace content directory.

At 320 the workspace component is provided to a collaboration workspace with one or more parameters related to the workspace component. The parameters define how the workspace component should be used in conjunction with the collaboration workspace and may include backend system event handlers, mappings of properties of a collaboration workspace with properties of a workspace component, and access control limitations. Following the prior example, the workspace component including the bulletin board tool may be provided to a collaboration workspace, such as the collaboration workspace defined by the template 235 of FIG. 2, with parameters that define access control limitations for the bulletin board. The parameters may be included in the workspace component or may be provided separately.

At 330 the workspace component is presented as part of the collaboration workspace. As an example, if the workspace component defines a collaboration tool or resource, presenting the component may involve presenting the collaboration tool or resource that is defined by the workspace component. As another example, if the workspace component modifies a collaboration tool, presenting the component may involve presenting the modified collaboration tool. The workspace component may be presented to a user interface, or to other software. For example, the workspace component may be presented to a software application separate from a collaboration workspace system, and that software application may present the workspace component to an interface. The workspace component may be presented to any type of interface, such as, for example, a graphical user interface.

Figure 4:
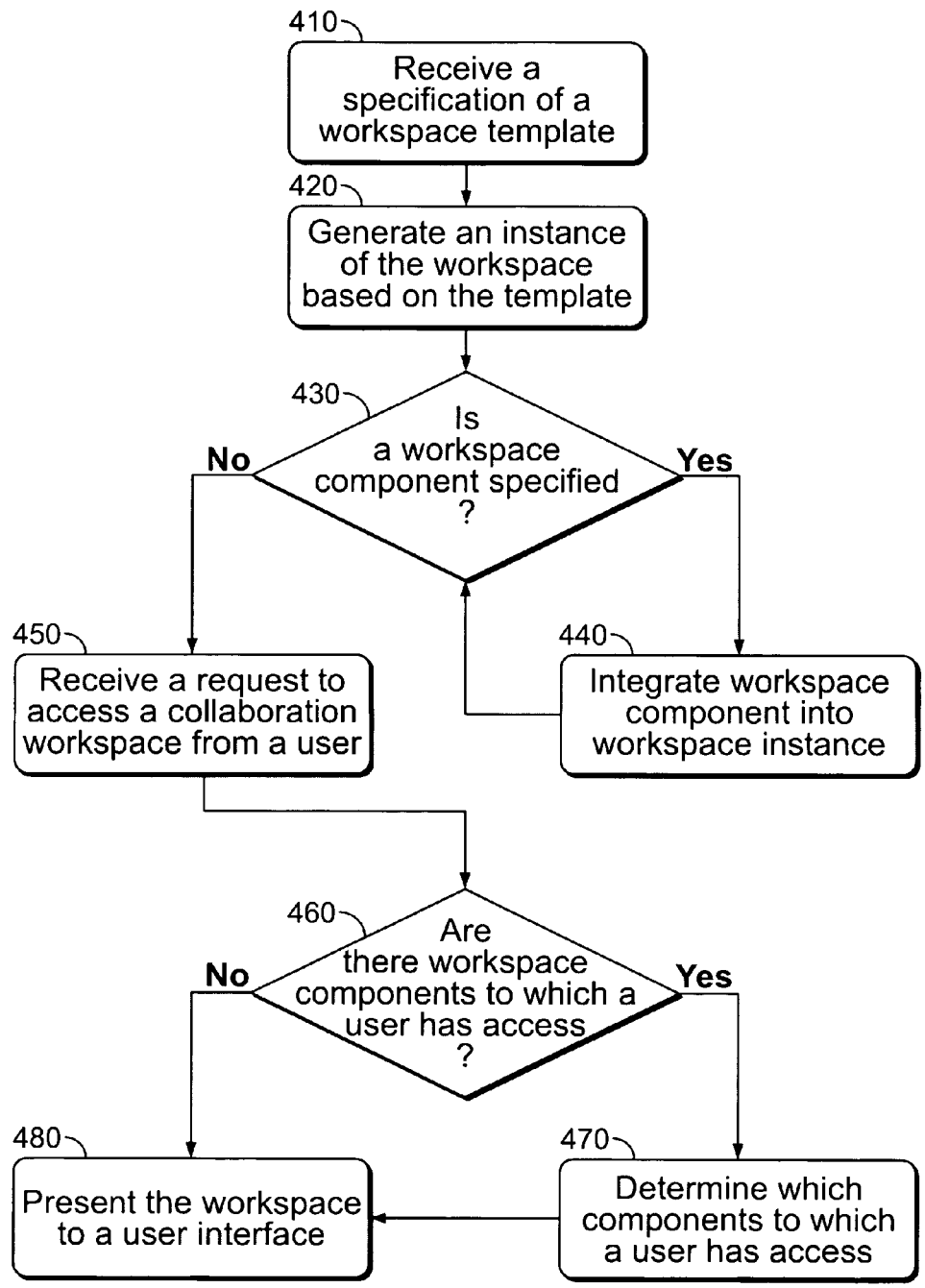
FIG. 4 is a flowchart of a process of presenting a collaboration workspace to a user interface.

FIG. 4 is a flowchart of a process of presenting a collaboration workspace to a user interface. At 410 a specification of a collaboration workspace template is received at a computer system. The template defines a combination of content (e.g., tools and resources) that should be part of a collaboration workspace. Defining the combination of content includes defining a layout, scheme, tools, and/or resources of a collaboration workspace. Because a template defines a default combination of content, a user may customize a collaboration workspace that is based on a template by choosing an appropriate template, and adding and/or removing workspace components.

Based on the template, an instance of a collaboration workspace is generated at 420. The collaboration workspace may be generated by a collaboration engine, such as the collaboration engine 210 of FIG. 2. Any combination of mechanisms and/or techniques may be used to generate the collaboration workspace. For example, generating an instance of a collaboration workspace may include deep copying a template to a directory where instances of a collaboration workspace are stored. An instance of a collaboration workspace may include data specific to that instance, such as a list of members that can access the collaboration workspace and program data related to the collaboration workspace.

At 430, a determination is made as to whether a workspace component has been specified to be included in the collaboration workspace generated at 420. A workspace component may be specified in a collaboration workspace template, or a workspace component may be separately specified. For example, a collaboration workspace may be generated based on a template and after the collaboration workspace is generated, a user may decide to add a workspace component to the collaboration workspace.

If a workspace component is specified, the workspace component is integrated into the collaboration workspace at 440; otherwise, the process continues at 450. The process of integrating the workspace component may involve copying the workspace component and parameters for the workspace component into the collaboration workspace. The parameters may be part of the workspace component or may be separately specified by a user. Further, the process of integrating the workspace component may involve mapping properties of the workspace component to the collaboration workspace. For instance, in a role-based collaboration system, if the roles defined for the collaboration workspace do not match the roles defined for the workspace component, the process may involve mapping the roles in the workspace component to the roles in the collaboration workspace.

The process of integrating the workspace component may involve user input. For example, a user may be prompted to define one or more parameters for the workspace component. In one implementation, if the integration of an additional workspace component is part of a process assisted by a wizard (e.g., a tool that assists in integrating workspace components), the wizard may prompt a user to define a name, description, and access rights for the workspace component. A workspace component may be integrated such that the workspace component may be separable from the collaboration workspace. As an example, a workspace component and associated parameters may be stored in a separate directory from the directory or set of files from an associated collaboration workspace. In that example, a component may be easily removed from the collaboration workspace or copied to another collaboration workspace by removing and/or copying the directory and/or set of files corresponding to the workspace component.

Although the processes of 430 and 440 depict workspace components being integrated into a collaboration workspace one at a time, in a variation of 430 and 440, several workspace components may be integrated into a collaboration workspace at substantially the same time. Once all the workspace components have been integrated, the process may continue at 450. Also, although at 420-440 a workspace component is added to a collaboration workspace after the collaboration workspace is generated, in other implementations the workspace component may be added at other times, such as during a process of forming the collaboration workspace.

At 450, a request is received to access a collaboration workspace from a user. The request may be received from a computer system, such as, for example, a client computer system of a client/server system. That request may include, for example, a request to enter a collaboration workspace along with a user name and password.

In response to receiving a request to access the collaboration workspace, a determination is made at 460 as to whether there are workspace components to which the user has access. In a role-based collaboration system, the process of 460 may involve determining, based on a role associated with the user, whether the role is defined to have access to workspace components. This may involve comparing access permissions of a role with access control restrictions of a workspace component.

If the user has access to workspace components, a determination is made at 470 as to which workspace components the user has access and the type of access the user has for each component. For example, in a role-based collaboration system, if the user is associated with a manager role, and the workspace has one workspace component that is a calendar tool, the collaboration workspace system may determine that the user has access to the calendar tool and that access includes access rights to view and edit the calendar tool.

At 480 the collaboration workspace is presented to the user at a user interface. If the user has access to workspace components, the collaboration workspace may be presented with those components to which the user has access; otherwise, the collaboration workspace may be presented without any workspace components. The user interface may be any type of appropriate user interface for presenting a collaboration workspace.

The techniques illustrated in FIG. 4 may be implemented across multiple computer systems in a client/server landscape. As an example of such an implementation, a collaboration system may include a server computer system and several client computer systems. In that implementation, the server computer system may receive a template and workspace components; form a collaboration workspace; and cause each client computer systems to present a collaboration workspace to a user. The collaboration workspace presented to each user may differ depending on the role associated with a user because each client may be used by a different user and each user may be associated with a different role. To provide varying collaboration workspaces to each user, the example implementation may include a web browser on each client and the web browsers may present different collaboration workspaces that are provided to each browser (i.e., each client). The server computer system may provide the different collaboration workspaces to each browser and manage generating the varying collaboration workspaces.

FIGS. 5A-5E and 6A-6D illustrate various displays that may be generated for a graphical user interface of a collaboration workspace system. The graphical user interface may be viewed and interacted with by a user that can generate and configure collaboration workspaces.

Figure 5A:
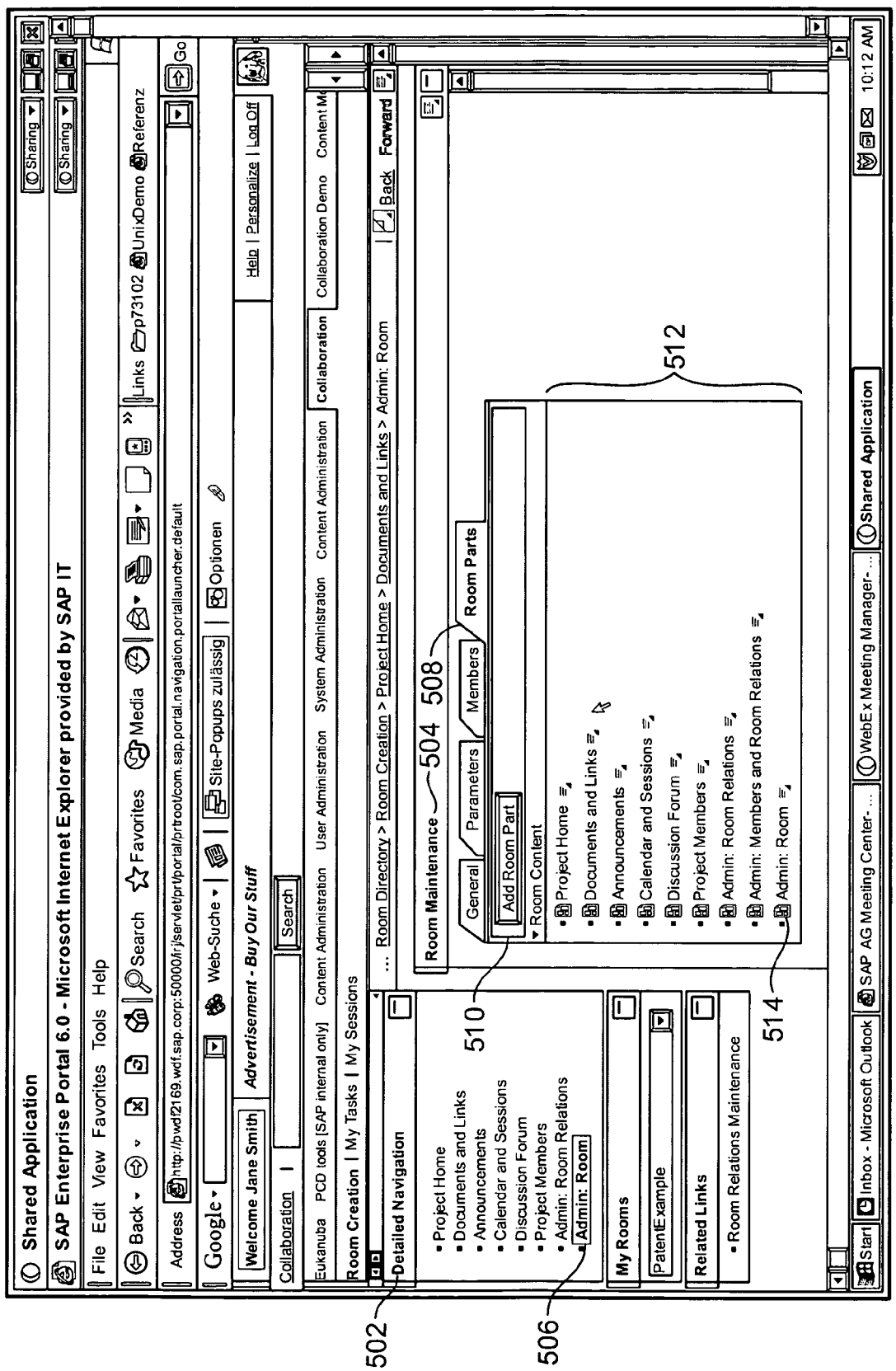
FIGS. 5A-5E illustrate a process of adding a workspace component to a collaboration workspace that has been formed.
Figure 5B:
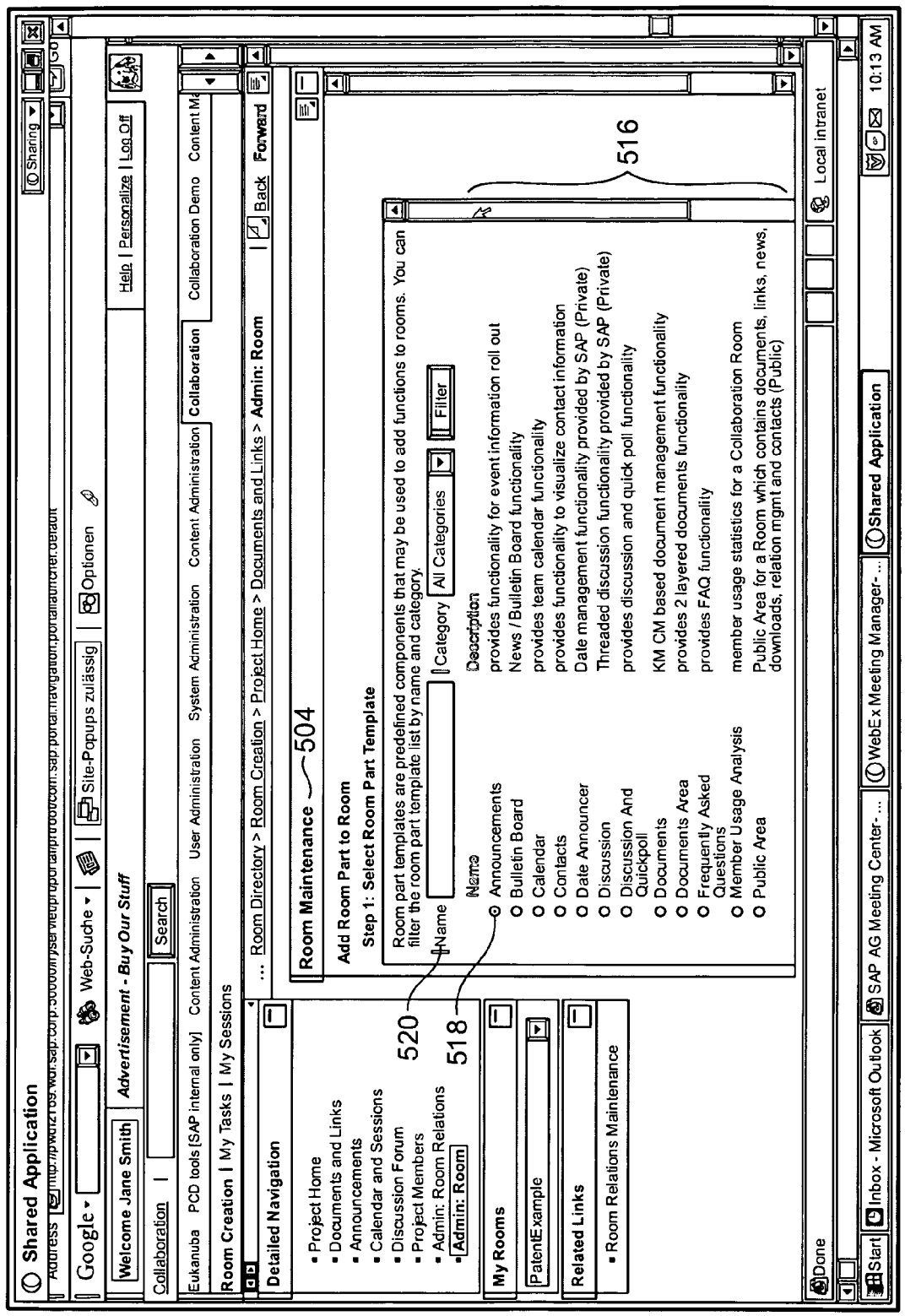

FIGS. 5A-5E illustrate a process of adding a workspace component to a collaboration workspace that has been formed. FIG. 5A illustrates a graphical user interface where a user can add workspace components (i.e., room parts) to a collaboration workspace. The graphical user interface is part of a collaboration workspace that includes a navigation portlet 502 that allows a user to navigate through the collaboration workspace. In the graphical user interface, the portlet 504 includes a tool for administering the room, as indicated by the title bar and the corresponding link 506 that includes the label "Admin:Room". In the portlet 504, there is a tab 508 (labeled "Room Parts") that provides users with an interface for adding workspace components. In that interface, a list 512 includes content in the collaboration workspace, including tools and resources. One example of workspace content is the list item 514, which corresponds to a tool labeled "Admin:Room" and corresponds to the "Admin:Room" link 506. To add a workspace component in to the collaboration workspace, a user can click on the button 510 labeled "Add Room Part". Other options in the interface can be accessed by a context menu (not shown). If a context menu appears (a context menu may appear, for example, if certain parts of the interface are right-clicked), a user may have options such as, removing a workspace component, organizing workspace content (e.g., ordering the list alphabetically, or according to whether room content is a workspace component or a content from a workspace template), and the like.

If the button 510 is clicked, the collaboration workspace starts a wizard for adding a workspace component to the collaboration workspace. As part of the wizard, the collaboration workspace updates the graphical user interface to include an updated portlet 504, as displayed in FIG. 5B. The updated portlet 504 includes a list 516 of radio buttons that can be used to select a workspace component that can be added. Each of the workspace components defines a modification to a collaboration workspace. For example, the selected radio button 518 corresponds to a workspace component that defines an announcement tool, with which announcements can be created and/or viewed by users of a collaboration workspace. To facilitate the process of finding a workspace component, the wizard includes a filter tool 520 for filtering the list 516 of workspace components.

Figure 5C:
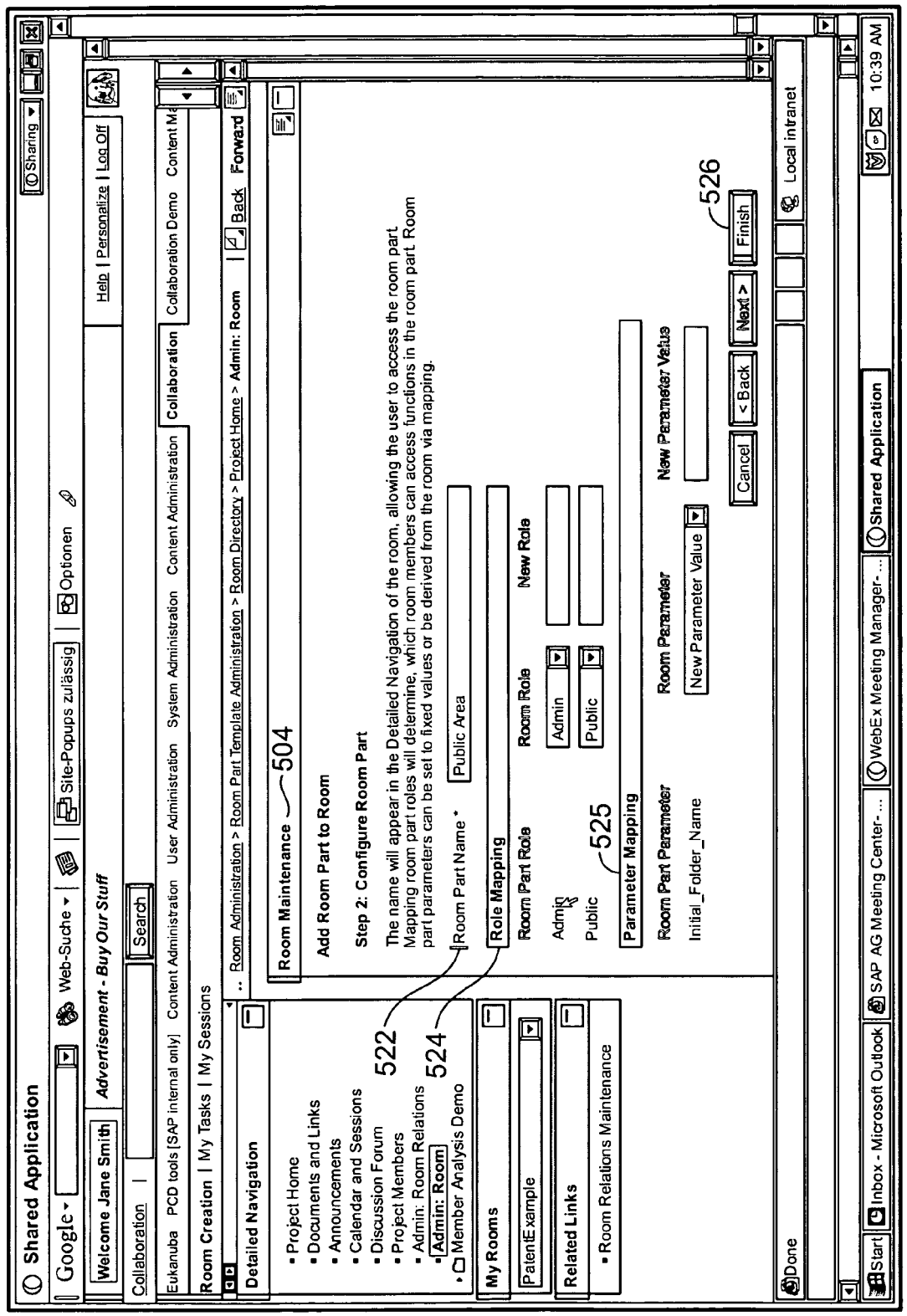

In response to selecting a workspace component and clicking a button (not shown), the portlet 504 is updated to include an interface for configuring parameters related to the workspace component, as illustrated in FIG. 5C. For example, the name of the workspace component can be chosen in the text box 522 and role mappings of the workspace component can be chosen with an interface 524 that includes a drop down list and a text box. Role mappings map roles that are defined for a workspace component to roles that are used by a collaboration workspace. By mapping roles, the collaboration workspace that includes the workspace component is able to apply the access permissions to a workspace component based on roles that were defined by the collaboration workspace. Thus, roles may be automatically mapped from a workspace component to a collaboration workspace and/or vice versa. Automatically mapping roles increases the detachability of workspace components by providing a way for the roles of a workspace component to be defined independently of a collaboration workspace and allowing the workspace component to be automatically added to a collaboration workspace.

In addition to role mappings, other parameters may be mapped in the parameter-mapping interface 525. For example, properties of a workspace component may be mapped to values and/or properties of a collaboration workspace. After choosing a configuration of a chosen workspace component, a user can proceed to integrate the workspace component with a collaboration workspace by clicking the button 526 labeled "Finish".

Figure 5D:
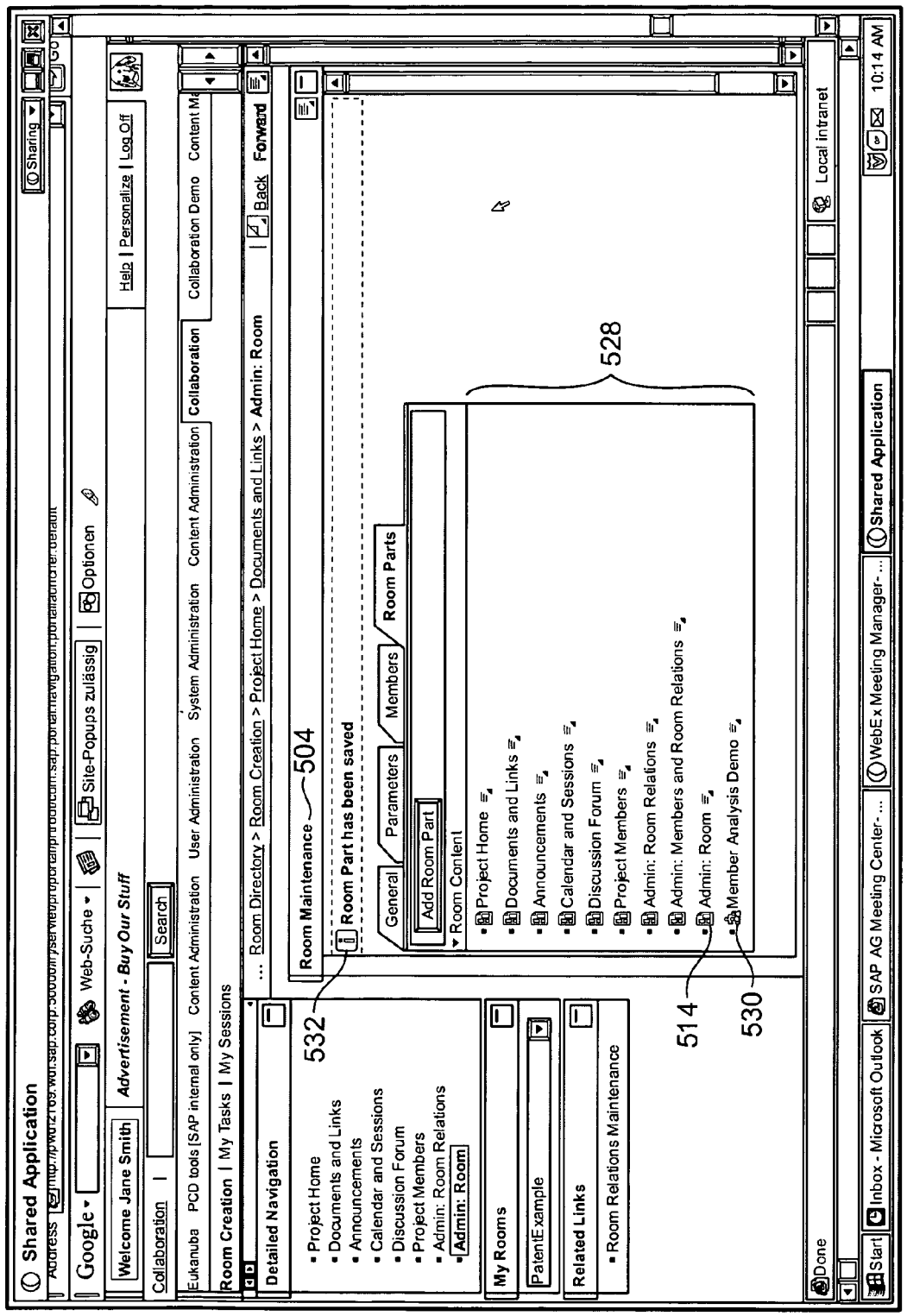
Figure 5E:
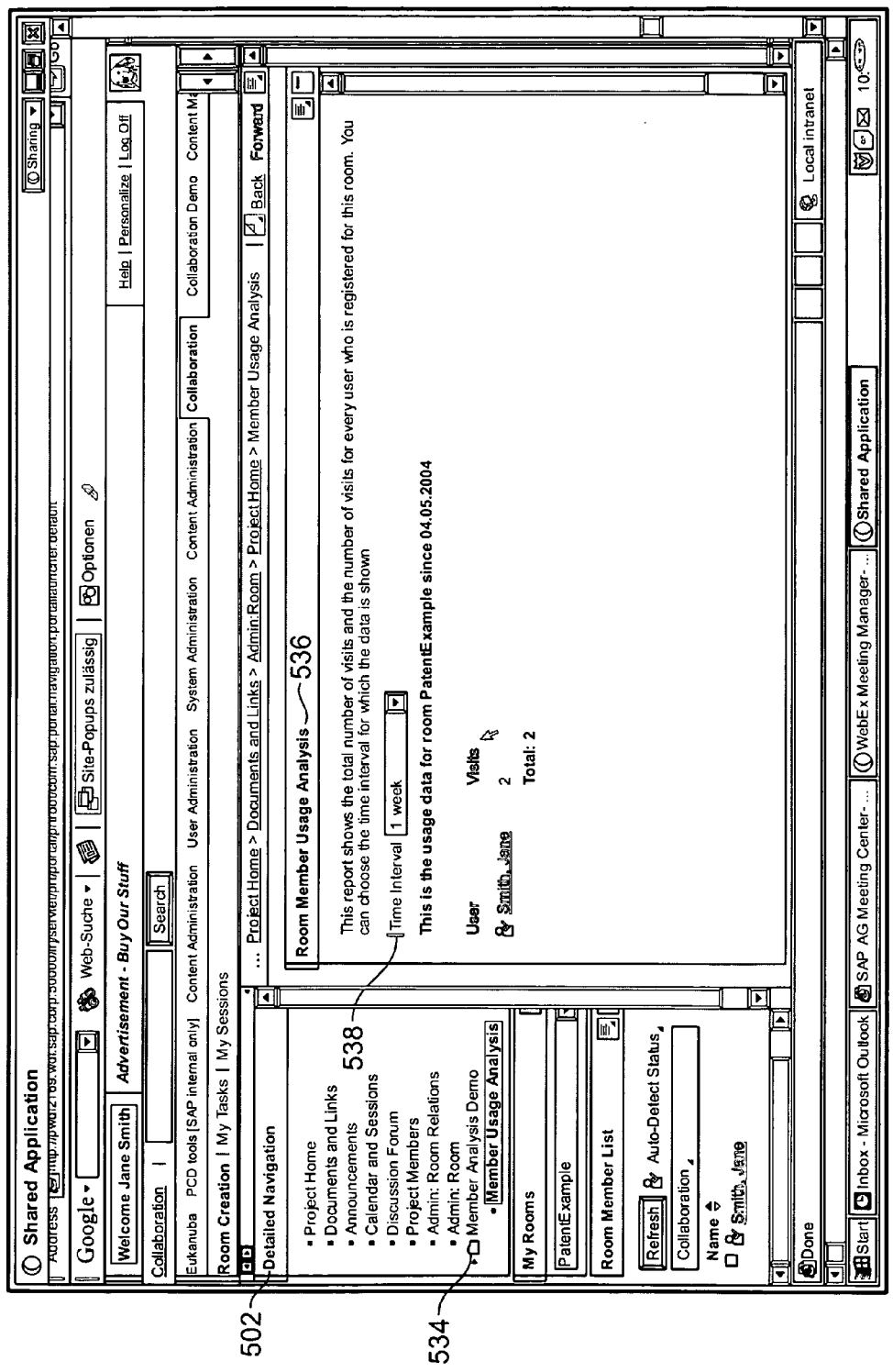

FIGS. 5D and 5E illustrate the result of adding a workspace component to a collaboration workspace. In FIG. 5D, an updated portlet 504 includes a list 528 of collaboration workspace contents. Compared to the collaboration workspace illustrated in FIG. 5A, the collaboration workspace of FIG. 5D includes a workspace component named "Member Analysis Demo" as indicated by the list item 530 of the list 528. This additional list item indicates that a workspace component has been added to the collaboration workspace. The fact that a workspace component is part of the content of the collaboration workspace is indicated by the icon corresponding to list item 530, which differs from the icon corresponding to list item 514 (which indicates that the content corresponding to list item 514 is part of a template used to generate the collaboration workspace).

The notice 532 indicates that a workspace component has been stored to a persistence area. A workspace component that is stored may include information such as parameters associated with a workspace component. By storing this information, in addition to the information that defines a modification to a collaboration workspace, a state of a workspace component is stored. For example, mappings of roles may be stored with a stored workspace component.

FIG. 5E illustrates a portlet that includes a tool known as "Member Analysis Demo," which monitors the usage of the collaboration workspace by users (i.e., members). The tool was defined by the workspace component that was added to the collaboration workspace. In FIG. 5E, the navigation portlet 502 is updated to include a link 534 (labeled "Member Analysis Demo") to the tool. The tool is presented in the portlet 536 and includes a pull-down menu 538 through which a user can configure the tool.

Although FIGS. 5A-5E illustrate a process of adding a workspace component to a collaboration workspace, via a wizard, in other implementations of a collaboration workspace system, a workspace component may also be removed from a collaboration workspace using a similar process and/or wizard. Also, a wizard need not be the only way a workspace component may be added to a collaboration workspace. Also, although the process shows a workspace component being added to a collaboration workspace that has been formed from a template, a collaboration workspace system may allow a workspace component to be added before or during the process of forming a collaboration workspace from a template. In alternative implementations, a template need not be used to create a collaboration workspace. For example, a combination of workspace components may be used to form a collaboration workspace and workspace components may be added and/or removed from that workspace.

FIGS. 6A-6D illustrate various aspects of a workspace component that can be configured. The workspace component illustrated in FIGS. 6A-6D is integrated in a collaboration workspace that has been formed. However, in some implementations of a collaboration workspace system, the workspace component can be configured at other times, such as during the process of integrating a workspace component with a collaboration workspace.

Figure 6A:
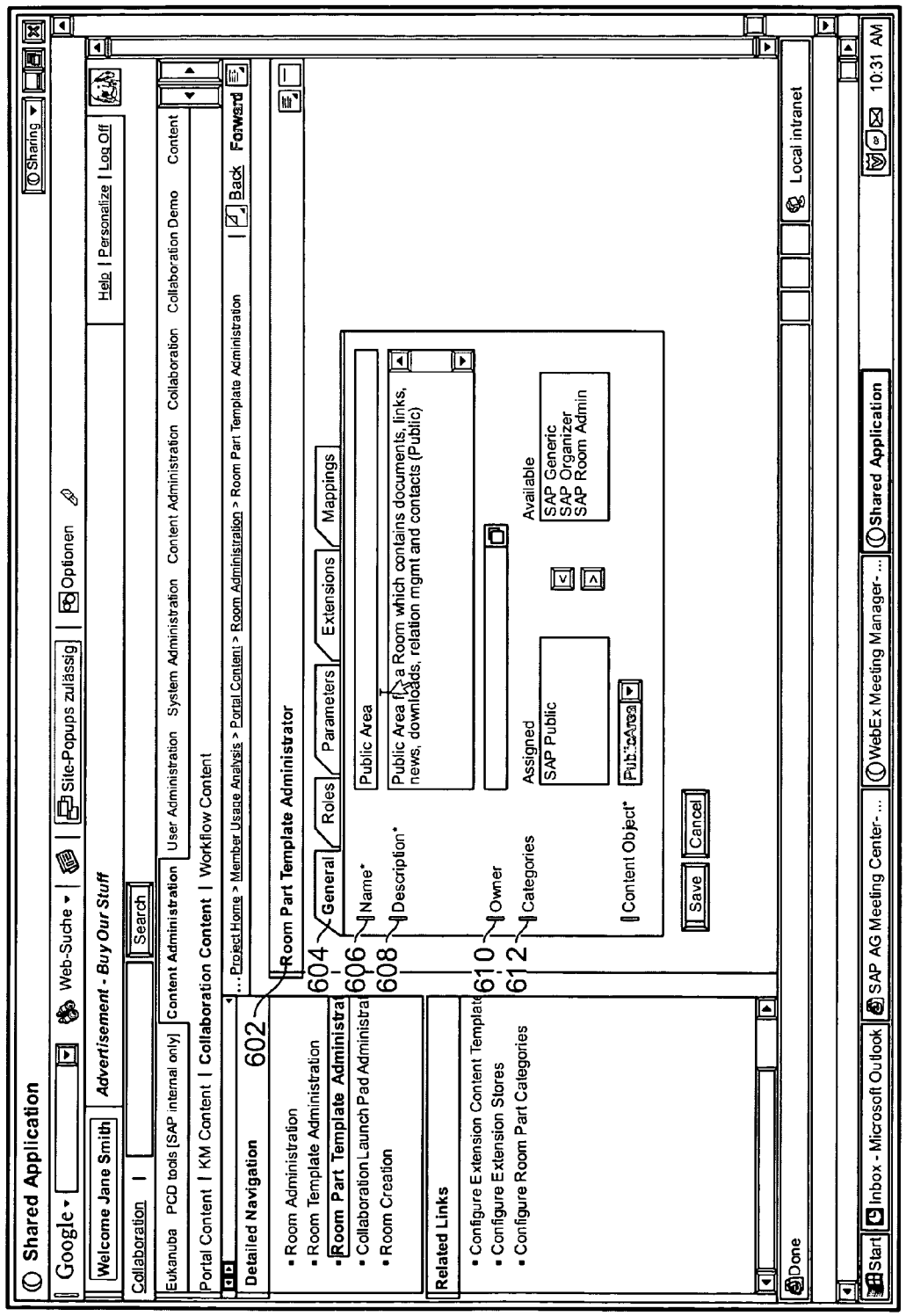
FIGS. 6A-6D illustrate various aspects of a workspace component that can be configured.

FIG. 6A illustrates an interface for configuring parameters of a workspace component in a portlet 602 under a tab 604 labeled "General". Parameters can define properties of an instance of a workspace component. The parameters that can be configured in FIG. 6A include a name, a description, an owner, and categories related to the workspace component. Those respective parameters can be configured in a text box 606, a text field 608, a text box 610, and a list selection box 612.

Figure 6B:
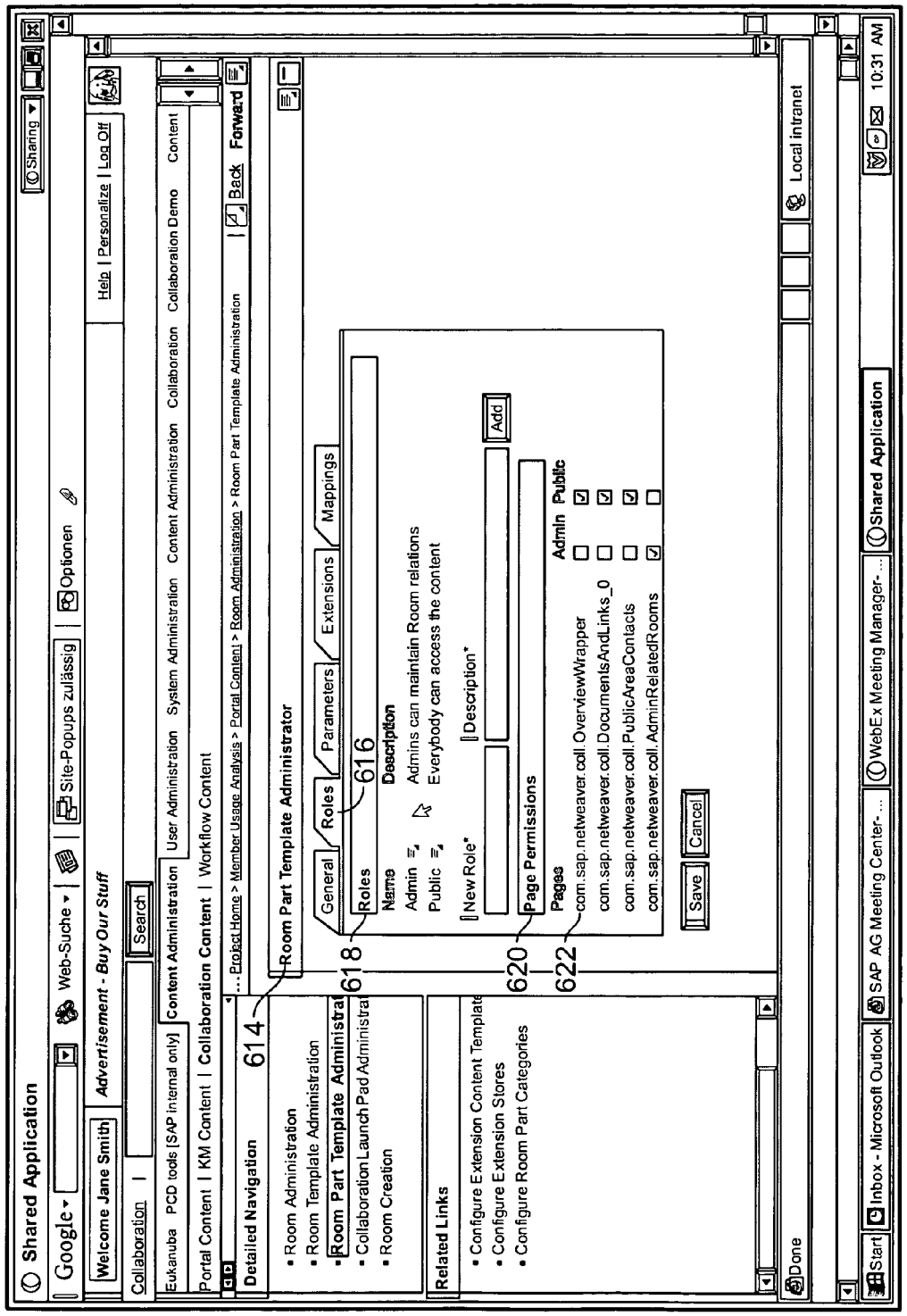

FIG. 6B illustrates an interface for configuring access control parameters of a workspace component in a portlet 614. Because the workspace component of FIGS. 6A-6D is a workspace component for a role-based collaboration workspace system, the parameters for access control are defined in terms of roles. Under a tab 616 labeled "Roles", different aspects of the roles can be configured for the workspace component. For example, the area 618 includes a list of roles, including an admin role and a public role, that are defined for the workspace component. In the area 620, permissions to access pages of the workspace component (i.e., content of a workspace component) are configured by using a series of checkboxes that are associated with the pages. In the collaboration workspace system of FIGS. 6A-6D each page defines a layout for one or more portlets and the content for those portlets, where a portlet is a program that retrieves data from content sources, such as a backend system or through the internet, and displays it in the portlet. An example of a page might be a discussion page that includes three portlets, each of which includes a view to one or more tools and/or resources. List item 622 is an example of a configuration of access control parameters. The page that corresponds to the list item 622 is configured such that users associated with the "Public" role are allowed to access that page. Although FIG. 6B allows users to choose access control parameters based on pages, access control parameters may be configured differently. For example, users may be able to select access control parameters for each tool or resource, rather than each page, available in a workspace component. In addition, other techniques may be used to define access control to a workspace content, thus the configuration interface may differ.

Figure 6C:
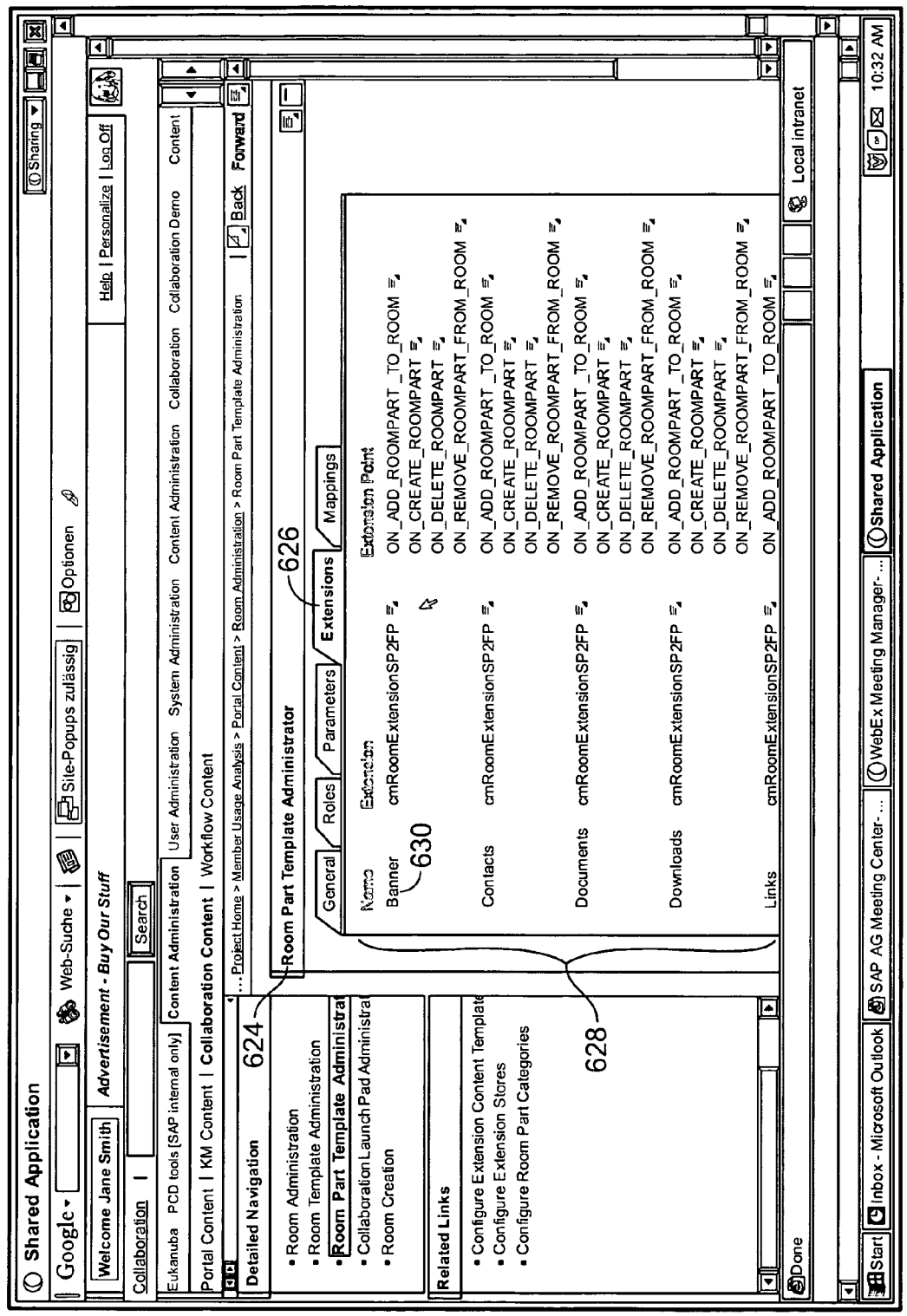

FIG. 6C illustrates an interface for configuring extensions of a workspace component in a portlet 624. Extensions (i.e., backend system event handlers) define how a workspace component interacts with a backend system upon certain lifecycle events. The extension points (i.e., the lifecycle events defined for calling an extension) can be defined by the collaboration workspace. In the portlet 624, extension points for each piece of content of a workspace component are associated with one or more extensions. For example, in a list 628 of workspace component content, the content named "Banner" includes extension points known as "ON_ADD_ROOMPART_TO_ROOM", "ON_CREATE_ROOMPART", "ON_DELETE_ROOMPART", and "ON_REMOVE_ROOMPART_FROM_ROOM". Those extension points are associated with the extension "cmRoomExtensionSPFP". Thus, on the occurrence of an event associated with an extension point, such as an event associated with the extension point "ON_ADD_ROOMPART_TO_ROOM", the extension "cmRoomExtensionSPFP" is used to access a backend system. As an example of how a backend system might be accessed, the extension "cmRoomExtensionSPFP" might define executable code that is called on the occurrence of an extension point. When the executable code is called, the code may cause a backend system to create a persistence area for a workspace component.

Figure 6D:
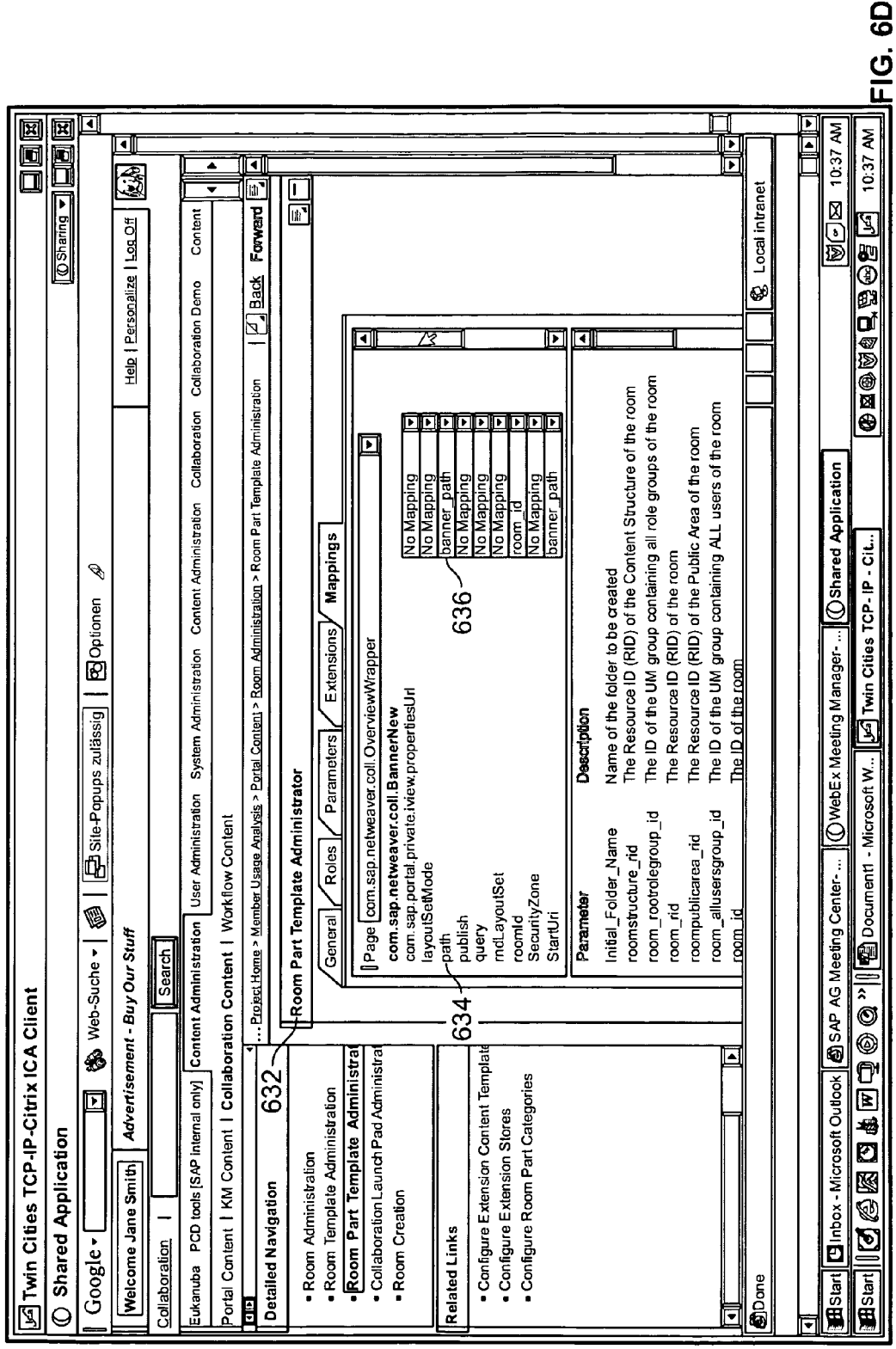

FIG. 6D illustrates an interface for configuring parameter mappings of a workspace component in a portlet 632. Parameter mappings define a mapping of a property of a workspace component to a property of a collaboration workspace. An example of parameter mapping is illustrated by the property "path" (634) to the property "banner_path" (636). The property "path" is a property of a workspace component. The property may be a variable, a function, and the like. The property "path_banner" is a property of a collaboration workspace. By configuring mappings from a workspace component to a collaboration workspace, content of the workspace component can be defined in the context of the workspace component and the content can interface with the collaboration workspace with reference to mappings. For example, if the property "path" is a variable used by a banner ad application of the workspace component that defines the path of where banner content can be found, the mapping of "path" to "banner_path" allows the banner ad application to access banner content when the workspace component is integrated with the collaboration workspace.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices) used to provide machine instructions and/or data to a programmable processor, including a machine-readable medium that receives machine instructions as a machine-readable signal. The term "machine-readable signal" refers to any signal used to provide machine instructions and/or data to a programmable processor.

Although the processes explained in FIGS. 3, 4, and 5A-5E are depicted as being composed of a certain number and type of processes, additional and/or different processes can be used instead. Similarly, the processes need not be performed in the order depicted. Thus, although a few implementations have been described in detail above, other modifications are possible. For example, although FIG. 4 depicts the addition of workspace components to a collaboration workspace that is instantiated, in alternative implementations the collaboration workspace may be instantiated with the workspace components, thus the processes of integrating the workspace components may vary. Other implementations may be within the scope of the following claims.

The invention claimed is:

1. A computer program product comprising instructions tangibly embodied in a computer-readable storage medium, the instructions causing a data processing apparatus to perform operations comprising:

receiving first data characterizing a selection of a template, the template being one of a plurality of templates and the template defining a collaboration workspace, the collaboration workspace comprising a collaboration application tool, a resource, and parameters of the template to map to additional reusable workspace components, the parameters of the template being properties of the collaboration workspace;

in response to the selection of the template, providing a first interface by generating a first instance of the collaboration workspace as defined by the selected template, the first interface comprising an area from which to select at least one of a plurality of reusable workspace components to add to the first instance of the collaboration workspace, the plurality of reusable workspace components configured to modify the collaboration workspace and provide content for the collaboration workspace;

receiving second data characterizing a selection of the at least one reusable workspace components, the selected at least one reusable workspace components being an application tool to enable provision of a service from a backend system, over a network, to the collaboration workspace defined by the template, the selected at least one reusable workspace components being encapsulated in a module separate from the template, the selected at least one reusable workspace components having parameters representing properties of the selected at least one reusable workspace components including extensions defining behaviors performed in conjunction with the backend system upon occurrence of a lifecycle event, the selected at least one reusable workspace components including one or more reusable workspace components having corresponding parameters not matching the parameters of the template;

in response to the selection of the at least one reusable workspace components, providing a second interface comprising another area from which to select parameters of the first instance of the collaboration workspace defined by the selected template to map to the parameters of the selected at least one reusable workspace components;

receiving from the second interface third data characterizing a selection of parameter mappings from the parameters of the first instance of the collaboration workspace to the parameters of the selected at least one reusable workspace components, the parameter mappings including associating the parameters of the template with the corresponding non-matching parameters of the one or more reusable workspace components, the parameter mappings comprising a selection of a first property of the first instance of the collaboration workspace and a first property of the selected at least one reusable workspace components;

receiving fourth data characterizing a selection of mapping of first access restrictions of the selected at least one reusable workspace components to second access restrictions of the collaboration workspace to enable the selected at least one reusable workspace components to access the backend system based on the access restriction defined for the collaboration workspace, the first access restrictions differing from the second access restrictions;

enforcing the mapping of the first access restrictions to the second access restrictions for access to the service of the backend system; and in response to selection of the parameter mappings, causing to be displayed a second instance of the collaboration workspace integrated with the selected at least one reusable workspace components, the integration based on the parameter mappings and causing to be displayed the selected at least one reusable workspace components to provide over the network the service of the backend system in the second instance of the collaboration workspace, the second instance of the collaboration workspace using a first mapping to cause values of the first property of the selected at least one reusable workspace components to be used as values of a first property of the second instance of the collaboration workspace.

2. The product of claim 1, wherein the operations further comprise: receiving a delivery of the selected at least one reusable workspace components from a third-party vendor, the delivery of the selected at least one reusable workspace components being separate from a delivery of the template.

3. The product of claim 1, wherein the selected at least one reusable workspace components is an application tool having distinct functionality from other of the at least one reusable workspace components and the application tool does not function as program data of the selected at least one reusable workspace components.

4. The product of claim 1, wherein the collaboration application tool is a self-contained productivity application that does not interact with other application tools in a context of the collaboration workspace, and the area of the second interface comprises:
   user interface elements for presenting a list of the parameters of the selected at least one reusable workspace components, and
   user interface elements from which to select one or more of the parameters of the template to map to one of the parameters of the selected at least one reusable workspace components in the list.

5. The product of claim 1, wherein the operations further comprise:
   providing a third interface comprising a third area from which to select extensions to map to extension points;
   receiving from the third interface fourth data characterizing a selection of a mapping of one of the extensions to an event of one of the extension points; and
   causing the one of the extensions to be executed in response to the event of the one of the extension points being triggered, the event being a life cycle event of the selected at least one reusable workspace components.

6. A computer-readable storage medium tangibly storing instructions to cause a data processing apparatus to perform operations comprising:
   receiving first data characterizing a selection of a template, the template being one of a plurality of templates and the template defining a collaboration workspace, the collaboration workspace comprising a collaboration application tool, a resource, and parameters of the template to map to additional reusable workspace components, the parameters of the template being properties of the collaboration workspace;
   in response to the selection of the template, providing a first interface by generating a first instance of the collaboration workspace as defined by the selected template, the first interface comprising an area from which to select at least one of a plurality of reusable workspace components to add to the first instance of the collaboration workspace, the plurality of reusable workspace components configured to modify the collaboration workspace and provide content for the collaboration workspace;
   receiving second data characterizing a selection of the at least one reusable workspace components, the selected at least one reusable workspace components being an application tool to enable provision of a service from a backend system, over a network, to the collaboration workspace defined by the template, the selected at least one reusable workspace components being encapsulated in a module separate from the template, the selected at least one reusable workspace components having parameters representing properties of the selected at least one reusable workspace components including extensions defining behaviors that should be performed in conjunction with the backend system upon occurrence of a lifecycle event, the extensions being triggered upon the occurrence of the lifecycle events, and access controls defining access to contents of the collaboration workspace, the selected at least one reusable workspace components including one or more reusable workspace components having corresponding parameters not matching the parameters of the template;
   in response to the selection of the at least one reusable workspace components, providing a second interface comprising another area from which to select the parameters of the first instance of the collaboration workspace defined by the selected template to map to the parameters of the selected at least one reusable workspace components;
   modifying the collaboration workspace based on a specification of the selected at least one reusable workspace components including adding a first content to the collaboration workspace, removing a second content from the collaboration workspace and removing an affinity between the specification of the selected at least one reusable workspace components and the collaboration workspace based on the extensions;
   receiving from the second interface third data characterizing a selection of parameter mappings, from the parameters of the first instance of the collaboration workspace, the parameters of the selected at least one reusable workspace components, the parameter mappings including associating the parameters of the template with the corresponding non-matching parameters of the one or more reusable workspace components, the parameter mappings comprising a selection of a first property of the first instance of the collaboration workspace and a first property of the selected at least one reusable workspace components;
   receiving fourth data characterizing a selection of mapping of first access restrictions of the selected at least one reusable workspace components to second access restrictions of the collaboration workspace to enable the selected at least one reusable workspace components to access the backend system based on the access restriction defined for the collaboration workspace, the first access restrictions differing from the second access restrictions;
   enforcing the mapping of the first access restrictions to the second access restrictions for access to the service of the backend system; and
   in response to selection of the parameter mappings, causing to be displayed a second instance of the collaboration workspace integrated with the selected at least one reusable workspace components, the integration based on the parameter mappings and causing to be displayed the selected at least one reusable workspace components to provide over the network the service of the backend system in the second instance of the collaboration workspace, the second instance of the collaboration workspace using a first mapping to cause values of the first property of the selected at least one reusable workspace components to be used as values of a first property of the second instance of the collaboration workspace.

7. The computer-readable storage medium of claim 6, wherein modifying the collaboration workspace includes adding the selected at least one reusable workspace components to the collaboration workspace, moving the selected at least one reusable workspace components between a plurality of collaboration workspaces, removing the selected at least one reusable workspace components from one collaboration workspace to another, sharing the selected at least one reusable workspace components across the plurality of collaboration workspaces, copying the selected at least one reusable workspace components, and deleting the selected at least one reusable workspace components.

8. The computer-readable storage medium claim 6, wherein the lifecycle events include creating, modifying, and deleting of the selected at least one reusable workspace components, adding new members to the collaboration workspace, providing access rights, and modifying the access rights for members.

9. The computer-readable storage medium claim 6, wherein the access controls restrict an ability of a user to access tools and/or resources.

* * * * *